United States Patent
Lee et al.

(10) Patent No.: US 9,547,151 B2
(45) Date of Patent: Jan. 17, 2017

(54) IMAGING LENS SYSTEM AND ELECTRONIC APPARATUS EMPLOYING THE SAME

(71) Applicant: SAMSUNG ELECTRONICS CO., LTD., Suwon-si, Gyeonggi-do (KR)

(72) Inventors: Tae-youn Lee, Yongin-si (KR); Jung-pa Seo, Suwon-si (KR); Yong-wook Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 71 days.

(21) Appl. No.: 14/301,857

(22) Filed: Jun. 11, 2014

(65) Prior Publication Data

US 2015/0168677 A1     Jun. 18, 2015

(30) Foreign Application Priority Data

Dec. 17, 2013 (KR) .......................... 10-2013-0157529

(51) Int. Cl.
G02B 9/62      (2006.01)
H04N 5/225     (2006.01)
G02B 13/00     (2006.01)

(52) U.S. Cl.
CPC .............. *G02B 9/62* (2013.01); *G02B 13/0045* (2013.01); *H04N 5/2258* (2013.01)

(58) Field of Classification Search
CPC ...... G02B 9/62; G02B 13/0045; H04N 5/2258
USPC .......................................... 348/335; 359/713
See application file for complete search history.

(56) References Cited

U.S. PATENT DOCUMENTS

| | | | | |
|---|---|---|---|---|
| 5,267,086 A | * | 11/1993 | Hirano | .................. G02B 13/20 359/707 |
| 6,031,998 A | * | 2/2000 | Shono | .................. H04N 5/2253 348/240.3 |
| 7,023,628 B1 | | 4/2006 | Ning | |
| 7,142,368 B2 | | 11/2006 | Kim et al. | |
| 7,230,776 B2 | | 6/2007 | Yamamoto | |
| 7,280,273 B2 | | 10/2007 | Tejada et al. | |
| 7,283,312 B2 | | 10/2007 | Kawada | |
| 7,286,297 B2 | | 10/2007 | Kawakami | |
| 7,286,302 B2 | | 10/2007 | Ohzawa et al. | |

(Continued)

FOREIGN PATENT DOCUMENTS

| | | |
|---|---|---|
| JP | 2009-294527 A | 12/2009 |
| JP | 2009-294528 A | 12/2009 |

(Continued)

*Primary Examiner* — Nhan T Tran
(74) *Attorney, Agent, or Firm* — Drinker Biddle & Reath LLP

(57) ABSTRACT

An imaging lens system is provided. The imaging lens system includes a first lens that includes a convex object side surface and has a positive refractive power; a second lens that includes a concave image plane side surface and has a negative refractive power; a third lens that has a positive or negative refractive power; a fourth lens that includes a convex image plane side surface and has a positive or negative refractive power; a fifth lens that includes a convex image plane side surface and has a negative refractive power; and a sixth lens that has a negative refractive power, wherein the first through sixth lenses are arranged in order from an object side to an image plane side.

19 Claims, 17 Drawing Sheets

(56) References Cited

U.S. PATENT DOCUMENTS

| | | |
|---|---|---|
| 7,298,561 B1 | 11/2007 | Yamashita et al. |
| 7,369,303 B2 | 5/2008 | Tejada |
| 7,369,319 B2 | 5/2008 | Chen |
| 7,466,490 B2 | 12/2008 | Igarashi |
| 7,502,181 B2 | 3/2009 | Shinohara |
| 7,542,219 B2 | 6/2009 | Saori |
| 7,564,634 B2 | 7/2009 | Lin et al. |
| 7,580,205 B2 | 8/2009 | Asami |
| 7,580,206 B2 | 8/2009 | Chang |
| 7,595,938 B2 | 9/2009 | Yamakawa et al. |
| 7,633,688 B2 | 12/2009 | Kamo |
| 7,656,593 B2 | 2/2010 | Do |
| 7,663,814 B2 | 2/2010 | Kitahara |
| 7,663,816 B2 | 2/2010 | Sato |
| 7,667,901 B2 | 2/2010 | Baba |
| 7,701,649 B2 | 4/2010 | Huang et al. |
| 7,768,719 B2 | 8/2010 | Jung et al. |
| 7,782,551 B2 | 8/2010 | Hsu et al. |
| 7,787,196 B2 | 8/2010 | Asami et al. |
| 7,864,452 B2 | 1/2011 | Ning |
| 7,869,141 B2 | 1/2011 | Ning |
| 7,889,442 B2 | 2/2011 | Suzuki et al. |
| 7,907,352 B2 | 3/2011 | Miyano |
| 7,924,510 B2 | 4/2011 | Kobayashi |
| 7,930,620 B2 | 4/2011 | Choi et al. |
| 7,933,078 B2 | 4/2011 | Jung et al. |
| 7,957,074 B2 | 6/2011 | Asami |
| 7,982,976 B2 | 7/2011 | Asami |
| 7,995,291 B2 | 8/2011 | Yamamoto |
| 8,000,036 B2 | 8/2011 | Luo |
| 8,000,037 B2 | 8/2011 | Hirao et al. |
| 8,014,083 B2 | 9/2011 | Do |
| 8,035,723 B2 | 10/2011 | Sano et al. |
| 8,040,618 B2 | 10/2011 | Kitahara |
| 8,054,562 B2 | 11/2011 | Asami |
| 8,064,147 B2 | 11/2011 | Hirao et al. |
| 8,223,245 B2 | 7/2012 | Kitahara |
| 8,237,842 B2 | 8/2012 | Wakamiya |
| 8,248,715 B2 | 8/2012 | Asami et al. |
| 8,270,098 B2 | 9/2012 | Fukuta et al. |
| 8,284,493 B2 | 10/2012 | Lee et al. |
| 8,289,630 B2 | 10/2012 | Togino |
| 8,331,039 B2 | 12/2012 | Mizusawa |
| 8,422,140 B2 | 4/2013 | Wang et al. |
| 2006/0050401 A1 | 3/2006 | Tadic-Galeb et al. |
| 2010/0188555 A1 | 7/2010 | Hirao et al. |
| 2010/0201782 A1 | 8/2010 | Yamada et al. |
| 2012/0026285 A1* | 2/2012 | Yoshida ............ G02B 13/06 348/36 |
| 2012/0188654 A1* | 7/2012 | Huang ............ G02B 9/62 359/713 |
| 2014/0354872 A1* | 12/2014 | Chen ............ G02B 9/62 348/335 |
| 2016/0011403 A1* | 1/2016 | Asami ............ G02B 9/62 359/740 |
| 2016/0011405 A1* | 1/2016 | Shinohara ........ G02B 9/62 359/713 |

FOREIGN PATENT DOCUMENTS

| | | |
|---|---|---|
| JP | 2012-155223 A | 8/2012 |
| KR | 10-2007-0097369 A | 10/2007 |
| KR | 10-2010-0001525 A | 1/2010 |
| KR | 10-2010-0040357 A | 4/2010 |
| KR | 10-2010-0043667 A | 4/2010 |
| KR | 10-2011-0024872 A | 3/2011 |

* cited by examiner

IMAGING LENS SYSTEM AND ELECTRONIC APPARATUS EMPLOYING THE SAME

CROSS REFERENCE TO RELATED APPLICATIONS

This application claims the priority benefit of Korean Patent Application No. 10-2013-0157529, filed on Dec. 17, 2013, in the Korean Intellectual Property Office, the disclosure of which is incorporated by reference herein in its entirety.

BACKGROUND

1. Field

Various embodiments of the present disclosure relate to a bright and large aperture imaging lens system and an electronic apparatus employing the same.

2. Related Art

Recently, digital cameras or video cameras that have solid-state imaging devices such as a charge coupled device (CCD) or a complementary metal-oxide semiconductor (CMOS) device have been widely distributed.

Since imaging apparatuses using the solid-state imaging devices are appropriate for miniaturization, in recent years, the imaging apparatuses have been applied to small information terminals such as cellular phones. Also, as consumer professionalism with respect to cameras has been continuously increasing, there is increasing demand for a design that provides optical performance suitable for various uses together with miniaturization.

Recently, a high pixel camera module of 10.3 million pixels, which is equipped with an imaging lens formed as a five piece lens and a CMOS sensor having a size of 1/3" has been developed and produced as a mobile phone camera. The camera module using this small sensor generally has a short focal length and a high F-number, and thus, a depth of field is great so that an effect whereby a background is blurred, such as out-focusing, is not performed well. However, consumer demand for a function like out-focusing has been increasing in a field of the mobile phone cameras. For this, a comparatively large image sensor having a diagonal length which is within a range of 1/1.83" to 1," may be used, and thus, a configuration of an optical system that is appropriate for this large image sensor is required.

SUMMARY

One or more embodiments of the present disclosure include a bright and large aperture imaging lens system capable of appropriate aberration correction.

Additional features will be set forth in part in the description which follows and, in part, will be apparent from the description, or may be learned by practice of the presented embodiments.

According to one or more embodiments of the present disclosure, an imaging lens system includes: a first lens that includes a convex object-side surface and has a positive refractive power; a second lens that includes a concave image plane side surface and has a negative refractive power; a third lens that has a positive or negative refractive power; a fourth lens that includes a convex image plane side surface and has a positive or negative refractive power; a fifth lens that includes a convex image plane side surface and has a negative refractive power; and a sixth lens that has a negative refractive power, wherein the first through sixth lenses are arranged sequentially from an object side to an image plane side.

The imaging lens system may satisfy the following conditional expression, $$15 < V_1 - V_2 < 45,$$

wherein $V_1$ and $V_2$ are Abbe numbers of the first lens and the second lens, respectively.

The imaging lens system may satisfy the following conditional expression, $$1.4 \le f/EPD \le 2.4,$$

wherein f is a focal length of the imaging lens system and EPD is an effective diameter of the imaging lens system.

The imaging lens system may satisfy the following conditional expression, $$0.7 < f/f_1 < 1.9,$$

wherein f is a focal length of the imaging lens system and $f_1$ is a focal length of the first lens.

The imaging lens system may satisfy the following conditional expression, $$0.9 < TL/f < 2.0,$$

wherein f is a focal length of the imaging lens system and TL is a distance from a vertex of the object side surface of the first lens to the image plane.

The imaging lens system may satisfy the following conditional expression, $$2.0 < f_5/f_6 < 25,$$

wherein $f_5$ and $f_6$ are focal lengths of the fifth lens and the sixth lens, respectively.

An image plane side surface of the sixth lens may be an aspherical surface that is concave near an optical axis and having at least one inflection point.

The imaging lens system may satisfy the following conditional expressions, $$1.52 < N_1 < 1.85,$$

$$1.58 < N_2 < 1.90, \text{ and}$$

$$1.51 < N_6 < 1.56,$$

wherein $N_1$, $N_2$, and $N_6$ are refractive indexes of the first lens, the second lens, and the sixth lens, respectively, at a d-line.

The imaging lens system may satisfy the following conditional expression, $$Y_{img}/\tan \omega > 5.5 \text{ mm},$$

wherein Yimg is a maximum image height on the image plane and w is a half angle of view.

The imaging lens system may satisfy the following conditional expressional expression, $$0.02 < D_{air56}/f < 0.20,$$

wherein $D_{air56}$ is an axial air distance between the fifth lens and the sixth lens and f is a focal length of the imaging lens system.

Each of the third through sixth lenses may be formed of a plastic material.

The first lens may be formed of a glass material.

A high-dispersive material having an Abbe number smaller than 35 may be used in two or more lenses of the first through sixth lenses.

At least one of the first lens, the second lens, the third lens, the fourth lens, the fifth lens, and the sixth lens may move along an optical axis to perform focusing.

The at least one of the first lens, the second lens, the third lens, the fourth lens, the fifth lens, and the sixth lens, which is relatively located on the object side, may form a focusing lens group, and when performing focusing, the focusing lens group may move along the optical axis and the remaining lenses of the first lens, the second lens, the third lens, the fourth lens, the fifth lens, and the sixth lens are fixed.

The focusing lens group may be formed of the first lens, the second lens, the third lens, and the fourth lens.

The first through sixth lenses may be divided into a front group formed of at least one lens that is relatively located on the object side and a rear group formed of the remaining lenses of the first lens, the second lens, the third lens, the fourth lens, the fifth lens, and the sixth lens that are relatively located on the image plane side. In a photographing mode, the front group and the rear group may be arranged along a common optical axis, and in a non-photographing mode, the rear group may be arranged by moving in a direction perpendicular to the optical axis, and the front group is arranged by moving toward the image plane side along the optical axis.

The front group may be formed of the first lens, the second lens, the third lens, and the fourth lens, and the rear group may be formed of the fifth lens and the sixth lens.

According to one or more embodiments of the present disclosure, an electronic apparatus includes: the imaging lens system described above; and an image sensor that converts an optical image formed by the imaging lens system into an electrical signal.

At least one lens of the imaging lens system may move along an optical axis to perform focusing.

The first through sixth lenses of the imaging lens system may be divided into a front group formed of at least one lens that is relatively located on the object side and a rear group formed of the remaining lenses that are relatively located on the image plane side. In a photographing mode, the front group and the rear group may be arranged along a common optical axis. In a non-photographing mode, the rear group may be arranged by moving in a direction perpendicular to the optical axis and the front group is arranged by moving toward the image plane side along the optical axis.

BRIEF DESCRIPTION OF THE DRAWINGS

These and/or other embodiments will become apparent and more readily appreciated from the following description of various embodiments, taken in conjunction with the accompanying drawings in which.

DETAILED DESCRIPTION

Figure 1:
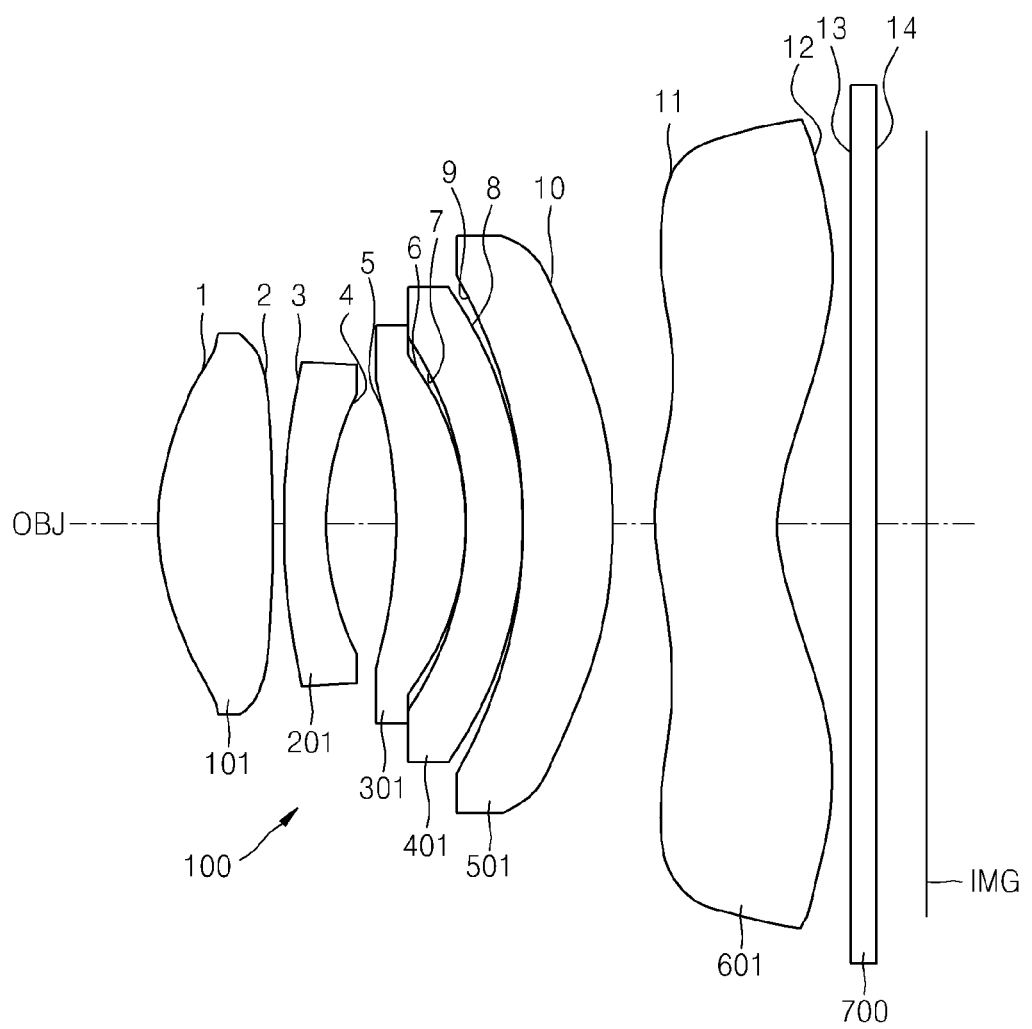
FIG. 1 is a cross-sectional view illustrating an optical arrangement of an imaging lens system according to a first embodiment.

Reference will now be made in detail to various embodiments, examples of which are illustrated in the accompanying drawings, wherein like reference numerals refer to the like elements throughout. In this regard, the embodiments may have different forms and should not be construed as being limited to the descriptions set forth herein. Accordingly, the embodiments are merely described below, by referring to the figures, to explain features of the present description. Expressions such as "at least one of," when preceding a list of elements, modify the entire list of elements and do not modify the individual elements of the list.

FIGS. 1, 4, 7, 10, and 13 are cross-sectional views respectively illustrating optical arrangements of imaging lens systems 100, 400, 700, 1000, and 1300 according to first through fifth embodiments.

The imaging lens systems 100, 400, 700, 1000, and 1300 according to the first through fifth embodiments have a shape of lens and power arrangement that enable correction of aberration which may occur when a large image sensor is used and enable achievement of a "bright lens." The imaging lens systems 100, 400, 700, 1000, and 1300 include six pieces of lenses and may appropriately configure a surface shape of each lens of the six pieces of lenses to effectively correct axial spherical aberration and off-axial coma aberration that are increased in providing the bright lens.

Referring to the drawings, the imaging lens systems 100, 400, 700, 1000, and 1300 include a first lens (e.g., lenses 101, 102, 103, 104, and 105), a second lens (e.g., lenses 201, 202, 203, 204, and 205), a third lens (e.g., lenses 301, 302, 303, 304, and 305), a fourth lens (e.g., lenses 401, 402, 403, 404, and 405), a fifth lens (e.g., lenses 501, 502, 503, 504, and 505), and a sixth lens (e.g., lenses 601, 602, 603, 604, and 605) that are sequentially arranged from an object OBJ side to an image plane IMG side.

The first lens 101 through 105 may have a positive refractive power, an image plane IMG side surface 2, and an object OBJ side surface 1 that is convex. The second lens 201 through 205 may have a negative refractive power, an object OBJ side surface 3, and an image plane IMG side surface 4 that is concave. The third lens 301 through 305 may have a positive or negative refractive power, an object OBJ side surface 5, and an image plane IMG side surface 6. The fourth lens 401 through 405 may have a positive or negative refractive power, an object OBJ side surface 7, and an image plane IMG side surface 8. The fifth lens 501 through 505 may have a negative refractive power, an object OBJ side surface 9, and an image plane IMG side surface 10 that is convex. The sixth lens 601 through 605 may have a negative refractive power, an object OBJ side surface 11, and an image plane IMG side surface 12.

A stop may be disposed on the object OBJ side 3 of the first lens 101 through 105, or between the first lens 101 through 105 and the second lens 201 through 205. A filter 700 with an object OBJ side 13 and image plane IMG side 14 may be disposed between the sixth lens 601 through 605 and the image plane IMG. The filter 700 may be an infrared (IR) cut-off filter. A cover glass (not shown) may further be disposed between the sixth lens 601 through 605 and the image plane IMG. An image sensor (not shown), such as a charge coupled device (CCD) or a complementary metal-oxide semiconductor (CMOS), is arranged along the image plane IMG.

The first lens 101 through 105 having a positive refractive power may be formed of a highly refractive glass material and as an aspherical lens for effective correction of coma aberration. The third lens 301 through 305 through the sixth lens 601 through 605 may be formed of a plastic material. The third through sixth lenses may be formed of a plastic material to reduce lens weight and manufacturing costs. However, at least one or two lenses, for example, the first lens 101 through 105, or the first lens 101 through 105 and the second lens 201 through 205 may be formed of a glass material to reduce an amount of change in movement of the image plane IMG due to an overall temperature change in the imaging lens system. In particular, the movement of the image plane IMG according to the temperature change may be offset by disposing the first lens 101 through 105 having a strong positive refractive power and the second lens 201 through 205 having a strong negative refractive power so that thermal defocus of the image plane IMG due to the temperature change may be reduced and other plastic lenses may be prevented from being exposed to the outside.

The second lens 201 through 205 has a concave image plane IMG side surface and is formed of a high-dispersive material.

Each of the third lens 301 through 305 and the fourth lens 401 through 405 may have a positive or negative refractive power. At least one surface of the third lens 301 through 305 and the fourth lens 401 through 405 may be an aspherical surface, which is effective for correction of coma aberration. Also, at least one of the third lens 301 through 305 and the fourth lens 401 through 405 may be formed of a high-dispersive material to have a negative refractive power for correction of chromatic aberration occurring due to a large aperture.

The sixth lens 601 through 605 may be formed such that the image plane IMG side surface is concave near the optical axis and convex toward the image plane IMG away from the optical axis so that residual astigmatic field curves and distortion of the first lens 101 through 105 through the fifth lens 501 through 505 may be corrected and color shading may be prevented by adjusting an angle at which a chief ray is incident on the image plane IMG.

The imaging lens system may satisfy the following conditional expression.

$$10 < V_1 - V_2 < 45 \quad (1)$$

Here, "$V_1$" and "$V_2$" are Abbe numbers of the first lens 101 through 105 and the second lens 201 through 205, respectively.

The above conditional expressions are conditional expressions for appropriately correcting overall chromatic aberration of the imaging lens system, that is, axial longitudinal chromatic aberration and off-axial chromatic aberration of magnification.

Since the chromatic aberration, in particular, the axial longitudinal chromatic aberration is increased in proportion to a focal length that is increased when a large sensor is used, a high-dispersive material may be used in order to reduce the increased chromatic aberration. Within the above range, chromatic aberration may be more easily corrected as $V_1 - V_2$ gets closer to a lower limit, and a costly advantageous material may be selected as $V_1 - V_2$ gets closer to an upper limit.

Also, the high-dispersive material may be used in two or more lenses of the six lenses to effectively correct chromatic aberration. For example, a high-dispersive material having an Abbe number smaller than 35 may be used in two lenses of the second lens 201 through 205, the third lens 301 through 305, and the fourth lens 401 through 405.

The imaging lens system 100, 400, 700, 1000, and 1300 may satisfy the following conditional expression.

$$1.4 \leq f/EPD \leq 2.4 \quad (2)$$

Here, "f" is a focal length of the imaging lens system 100, 400, 700, 1000, and 1300, and "EPD" is an effective diameter of the imaging lens system 100, 400, 700, 1000, and 1300. That is, the conditional expression (2) defines an F-number of the imaging lens system 100, 400, 700, 1000, and 1300.

The imaging lens system 100, 400, 700, 1000, and 1300 may satisfy the following conditional expression:

$$0.7 < f/f_1 < 1.9 \quad (3)$$

Here, "f" is a focal length of the imaging lens system, and "$f_1$" is a focal length of the first lens 101 through 105.

The conditional expression (3) defines a refractive power of the first lens 101 through 105. Outside a range of a lower limit of the conditional expression (3), the refractive power of the first lens 101 through 105 is reduced so that overall longitudinal chromatic aberration of the imaging lens system 100, 400, 700, 1000, and 1300 is increased. Outside the range of the upper limit of the conditional expression (3), the refractive power of the first lens 101 through 105 is excessively increased so that spherical aberration is increased and it may be difficult to correct aberration.

The imaging lens system 100, 400, 700, 1000, and 1300 may satisfy the following conditional expression:

$$0.9 < TL/f < 2.0 \qquad (4)$$

Here, "f" is a focal length of the imaging lens system 100, 400, 700, 1000, and 1300, and "TL" is a total length, that is, a distance from the vertex of the object OBJ side surface of the first lens 101 through 105 to the image plane IMG.

Outside a range of an upper limit of the conditional expression (4), although it may be easier to correct axial and off-axial aberrations, miniaturization of the imaging lens system 100, 400, 700, 1000, and 1300 may be difficult due to an increase in an optical total length. Outside a range of a lower limit of the conditional expression (4), miniaturization of the imaging lens system 100, 400, 700, 1000, and 1300 may be easier, but a lens thickness may be reduced so that it may be difficult to form lenses and sensitivity is increased, thereby leading to a reduced productivity.

The imaging lens system 100, 400, 700, 1000, and 1300 may satisfy the following conditional expression:

$$2.0 < f_5/f_6 < 25 \qquad (5)$$

Here, "$f_5$" is a focal length of the fifth lens 501 through 505, and "$f_6$" is a focal length of the sixth lens 601 through 605.

The conditional expression (5) deals with a ratio of the focal length of the fifth lens 501 through 505 having a negative refractive power to the focal length of the sixth lens 601 through 605 having a negative refractive power.

Within a range of an upper limit, the total length of the imaging lens system 100, 400, 700, 1000, and 1300 may be reduced. However, outside a range of a lower limit, it may be difficult to correct astigmatic field curves.

The imaging lens system 100, 400, 700, 1000, and 1300 may satisfy the following conditional expressions:

$$1.52 < N_1 < 1.85 \qquad (6)$$

$$1.58 < N_2 < 1.90, \text{ and} \qquad (7)$$

$$1.51 < N_6 < 1.56 \qquad (8)$$

Here, "$N_1$", "$N_2$", and "$N_6$" are refractive powers of the first lens 101 through 105, the second lens 201 through 205, and the sixth lens 601 through 605, respectively, at a d-line.

The conditional expressions (6) through (8) are based on costs of manufacturing, reduction of weight, and availability of lens manufacturing. A plastic material satisfying the conditional expressions (6) through (8) may be used in the first lens 101 through 105, the second lens 201 through 205, and the sixth lens 601 through 605.

The imaging lens system 100, 400, 700, 1000, and 1300 may satisfy the following conditional expression:

$$Y_{img}/\tan \omega > 5.5 \text{ mm} \qquad (9)$$

Here, "$Y_{img}$" is a maximum image height on the image plane IMG and "ω" is a half angle of view.

The conditional expression (9) defines a rate of the maximum image height with respect to the half angle of view. Within a range satisfying the conditional expression (9), a large image sensor having a size of about 1/1.7," which is greater than a small image sensor having a size of about ¼" to about ⅓," may be employed to achieve a high quality image and perform an effect like out-focusing (an effect whereby a background is blurred) that may be difficult to perform using a small image sensor.

The imaging lens system 100, 400, 700, 1000, and 1300 may satisfy the following conditional expression.

$$0.02 < D_{air56}/f < 0.20 \qquad (10)$$

Here, "$D_{air56}$" is an axial air distance between the fifth lens 501 through 505 and the sixth lens 601 through 605 and "f" is a focal length of the imaging lens system.

The conditional expression (10) is with respect to an air distance between the fifth lens 501 through 505 and the sixth lens 601 through 605. By appropriately configuring the value of the conditional expression (10), a shading mask that prevents an unnecessary ray like a ghost light may be more easily disposed between the fifth lens 501 through 505 and the sixth lens 601 through 605. In addition, in the case of previous optical systems, when performing a function such as auto-focusing, the entire optical system may move along a direction of an optical axis. However, when a distance between the fifth lens 501 through 505 and the sixth lens 601 through 605 is obtained based on the conditional expression (10), only a portion of an optical system, instead of the entire optical system, for example, the first lens 101 through 105 through the fifth lens 501 through 505 may move along the direction of the optical axis. Therefore, a simplified device design of an auto-focusing driving unit may be achieved, and, accordingly, the overall weight of the optical system is reduced, thereby making the optical system small and light and reducing power consumption.

Also, the imaging lens system 100, 400, 700, 1000, and 1300 may be formed such that at least one of the first lens 101 through 105, the second lens 201 through 205, the third lens 301 through 305, the fourth lens 401 through 405, the fifth lens 501 through 505, and the sixth lens 601 through 605 moves along an optical axis to perform focusing. For example, when performing auto-focusing to a nearest distance from an infinite object distance, the entirety of the first lens 101 through 105, the second lens 201 through 205, the third lens 301 through 305, the fourth lens 401 through 405, the fifth lens 501 through 505, and the sixth lens 601 through 605 may move together along the optical axis. Alternatively, a part of the first 101 through 105 to sixth lens 601 through 605, that is, at least one of the first lens 101 through 105 to sixth lens 601 through 605 may move along the optical axis. In this case, the at least one of the first 101 through 105 to sixth lens 601 through 605, which is relatively located on the object OBJ side, forms a focusing lens group. When focusing is performed, the focusing lens group may move along the optical axis and the rest of the lenses may be fixed. One example of a more detailed configuration will be described with reference to the fifth embodiment.

In addition, the imaging lens system 100, 400, 700, 1000, and 1300 may have a retractable configuration so that a storage size may be minimized. One example of a more detailed configuration will be described with reference to the fifth embodiment.

Hereinafter, more detailed configurations according to various embodiments will be described with respect to lens data. In the lens data, "ST" denotes a stop, and the mark "*" after surface numbers denotes that the surfaces are aspherical. "f" denotes an overall focal length, "F/#" denotes an F-number, and "ω" denotes a half angle of view. The units of a focal length, an optical total length, a radius of curvature, a thickness, and a size are millimeters (mm).

An aspherical surface is defined as follows:

$$Z = \frac{cY^2}{1+\sqrt{1-(1+K)c^2Y^2}} + AY^4 + BY^6 + CY^8 + DY^{10} + EY^{12} + FY^{14} + \ldots$$

In the above equation, "Z" denotes a distance from the vertex of a lens in a direction along an optical axis, "Y" denotes a distance in a direction perpendicular to the optical axis, "K" denotes a conic constant, "A", "B", "C", "D", "E", and "F" each denotes an aspherical surface coefficient, and "c" denotes a reciprocal number (=1/R) of a radius of curvature.

First Embodiment

FIG. 1 is a cross-sectional view illustrating the optical arrangement of the imaging lens system 100 according to the first embodiment.

The imaging lens system 100 includes the first lens 101 having a positive refractive power, the second lens 201 having a negative refractive power, the third lens 301 having a positive refractive power, the fourth lens 401 having a negative refractive power, the fifth lens 501 having a negative refractive power, and the sixth lens 601 having a negative refractive power that are sequentially arranged from the object OBJ side to the image plane IMG side. A stop (not shown) is disposed on the image plane IMG side surface 1 of the first lens 101.

Lens data of the first embodiment is as follows.

Figure 2:
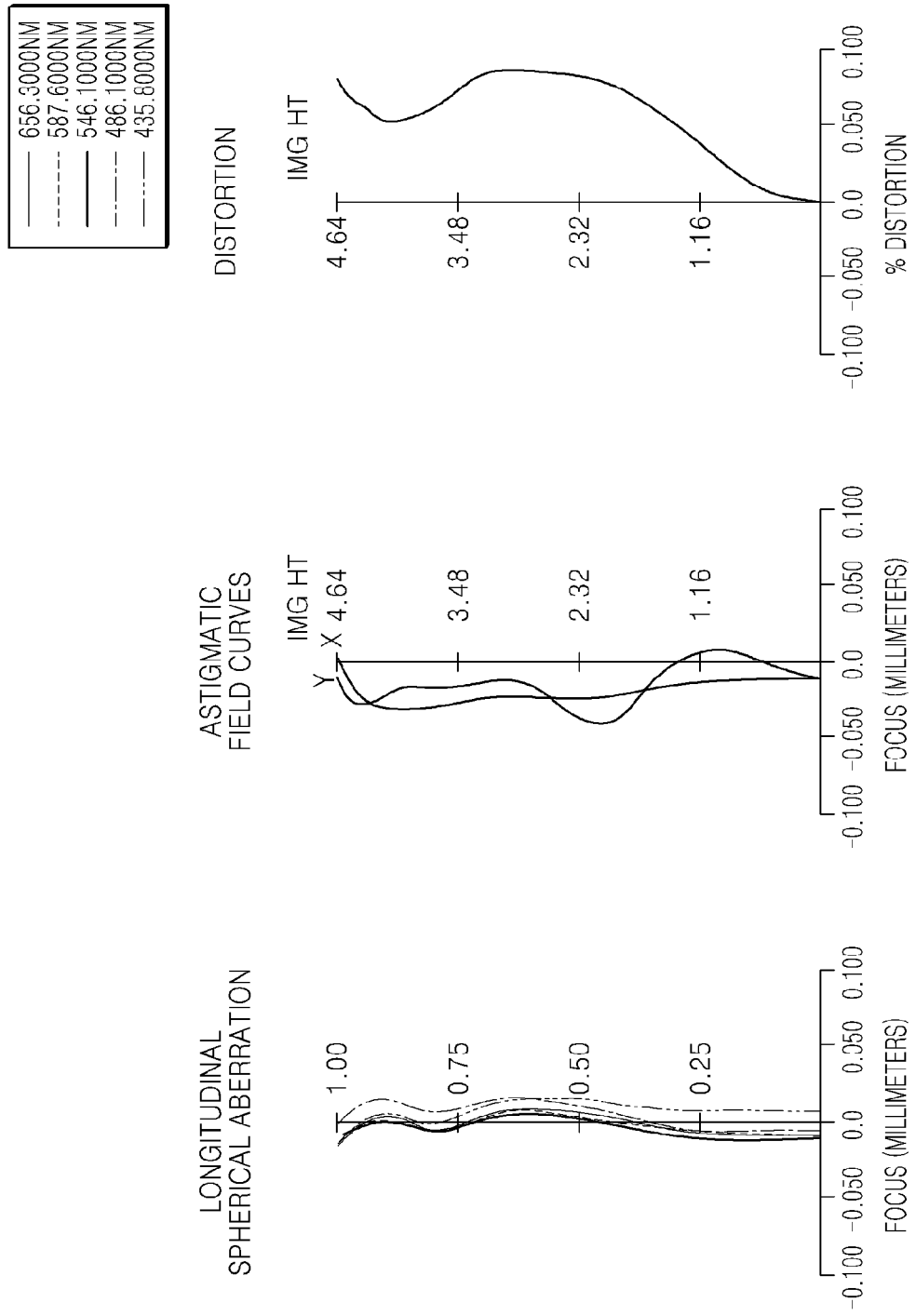
FIG. 2 is an aberration diagram illustrating longitudinal spherical aberration, astigmatic field curves, and distortion of the imaging lens system of FIG. 1, according to an embodiment.
Figure 3:
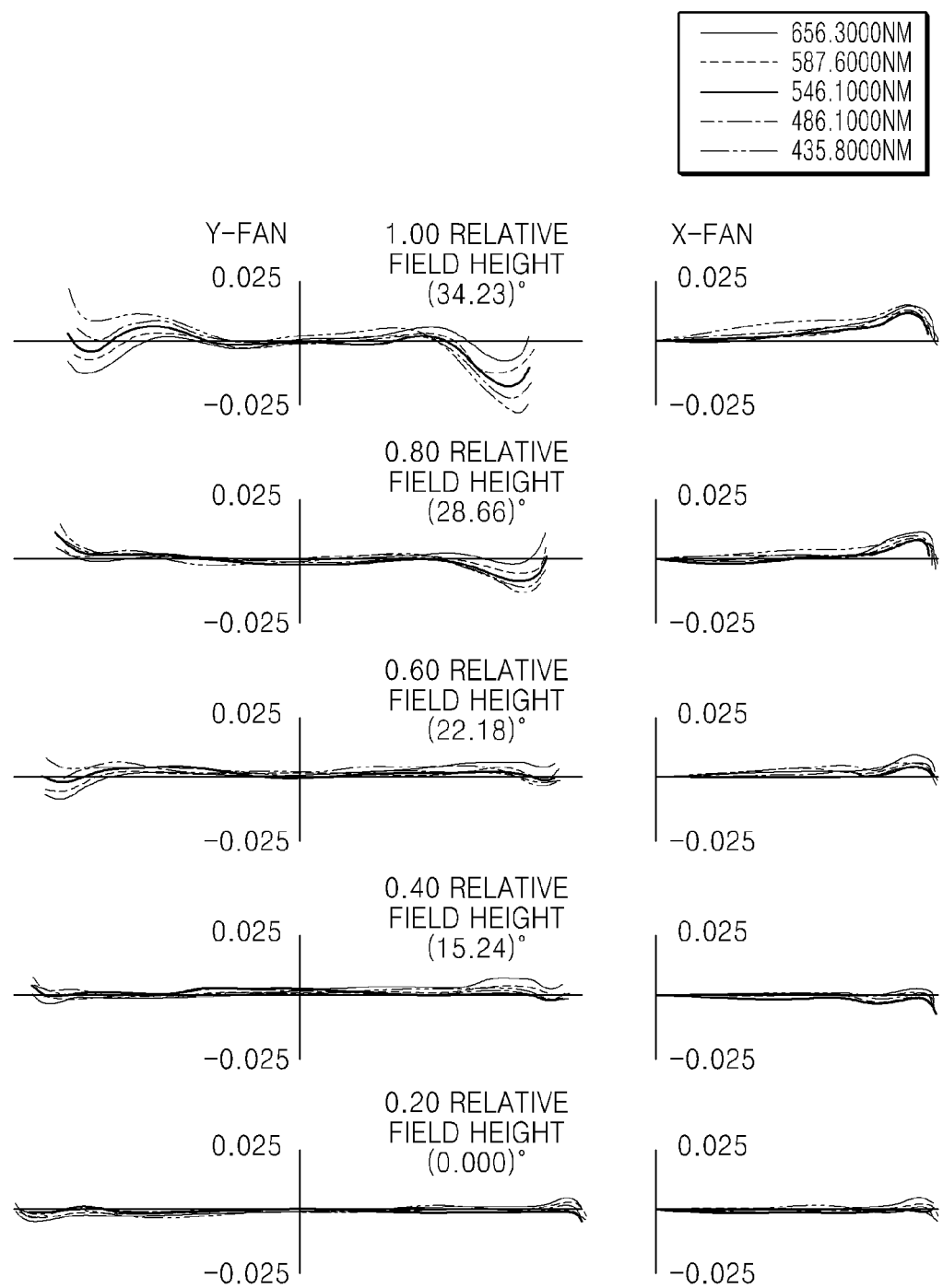
FIG. 3 is an aberration diagram illustrating coma aberration of the imaging lens system of FIG. 1, according to an embodiment.

FIG. 2 is an aberration diagram illustrating longitudinal spherical aberration, astigmatic field curves, and distortion of the imaging lens system 100 of FIG. 1. FIG. 3 is an aberration diagram illustrating coma aberration of the imaging lens system 100 of FIG. 1. The longitudinal spherical aberration and coma aberration are illustrated with respect to light having a wavelength of 656.30 nm, 587.60 nm, 546.10 nm, 486.10 nm, and 435.80 nm. The astigmatic field curves and distortion are illustrated with respect to light having a wavelength of 546.10 nm. Also, in the graph of the astigmatic field curves, sagittal field curvature and tangential field curvature are illustrated as "X" and "Y".

Second Embodiment

Figure 4:
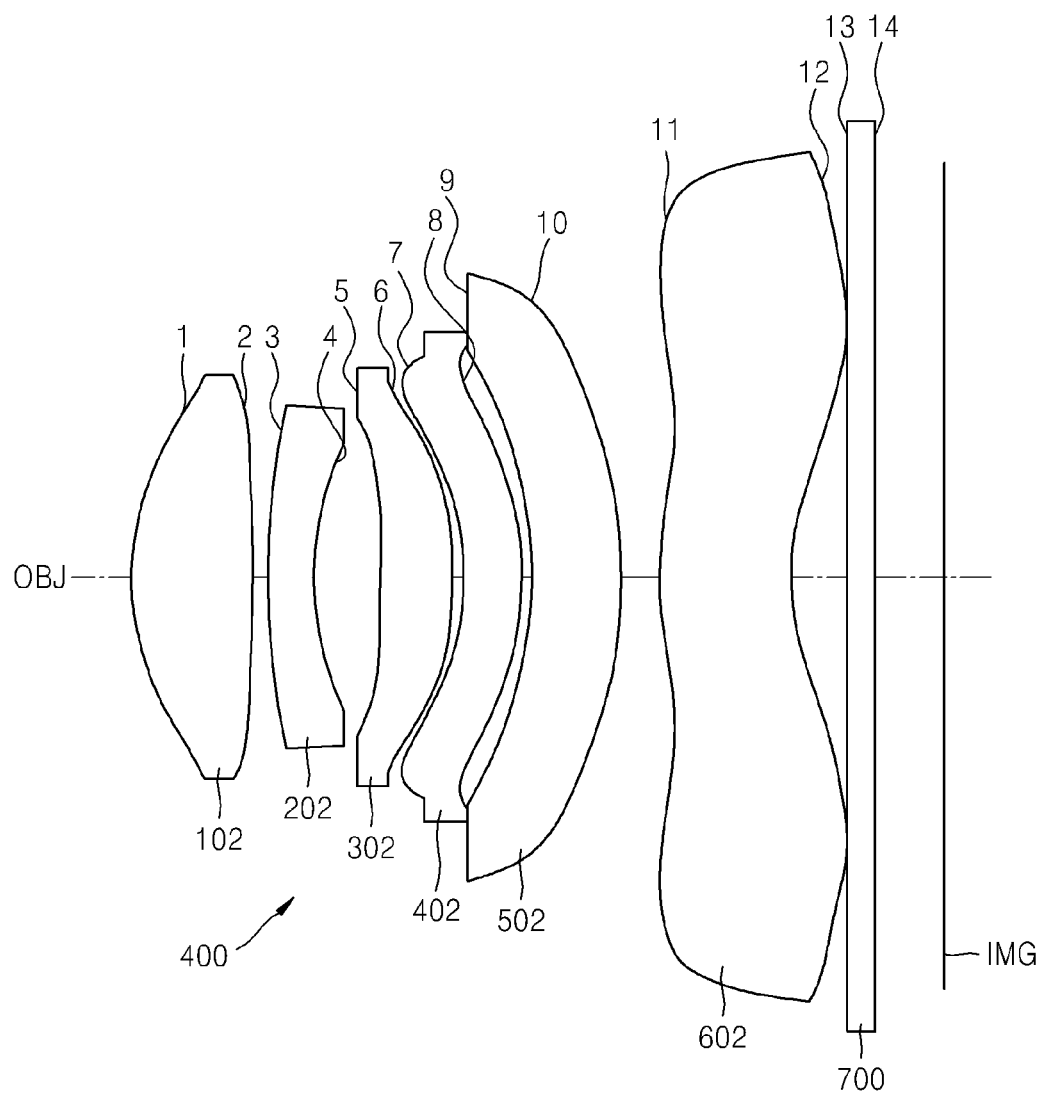
FIG. 4 is a cross-sectional view illustrating an optical arrangement of an imaging lens system according to a second embodiment.

FIG. 4 is a cross-sectional view illustrating the optical arrangement of the imaging lens system 400 according to the second embodiment.

The imaging lens system 400 includes the first lens 102 having a positive refractive power, the second lens 202 having a negative refractive power, the third lens 302 having a positive refractive power, the fourth lens 402 having a negative refractive power, the fifth lens 502 having a negative refractive power, and the sixth lens 602 having a negative refractive power that are sequentially arranged from the object OBJ side to the image plane IMG side. A stop (not shown) is disposed on the image plane IMG side surface of the first lens 102.

Lens data of the second embodiment is as follows.

TABLE 1

| | Radius of curvature (R) | Thickness or interval | Refractive index (nd) | Abbe number (vd) |
|---|---|---|---|---|
| OBJ | infinity | infinity | | |
| 1* | 3.162 | 1.323 | 1.544 | 56.09 |
| 2(ST)* | −13.554 | 0.112 | | |
| 3* | 7.434 | 0.5 | 1.643 | 22.4 |
| 4* | 3.012 | 0.796 | | |
| 5* | −15.922 | 0.8 | 1.544 | 56.09 |
| 6* | −4.373 | 0.05 | | |
| 7 | −3.819 | 0.6 | 1.636 | 23.9 |
| 8 | −4.936 | 0.05 | | |
| 9 | −5.643 | 1.025 | 1.544 | 56.09 |
| 10* | −6.332 | 0.491 | | |
| 11* | 3.286 | 1.415 | 1.544 | 56.09 |
| 12* | 2.315 | 0.85 | | |
| 13 | infinity | 0.3 | 1.517 | 64.2 |
| 14 | infinity | 0.578 | | |
| IMG | infinity | 0 | | |

TABLE 3

| | Radius of curvature (R) | Thickness or interval | Refractive index (nd) | Abbe number (vd) |
|---|---|---|---|---|
| OBJ | infinity | infinity | | |
| 1* | 3.039 | 1.324 | 1.544 | 56.09 |
| 2(ST)* | −17.77 | 0.162 | | |
| 3* | 8.835 | 0.5 | 1.643 | 22.4 |
| 4* | 3.17 | 0.725 | | |
| 5* | −66.483 | 0.8 | 1.544 | 56.09 |
| 6* | −4.961 | 0.122 | | |
| 7 | −2.94 | 0.634 | 1.636 | 23.9 |
| 8 | −3.466 | 0.096 | | |
| 9 | −4.835 | 0.993 | 1.544 | 56.09 |
| 10* | −5.344 | 0.431 | | |
| 11* | 3.858 | 1.431 | 1.544 | 56.09 |
| 12* | 2.386 | 0.612 | | |
| 13 | infinity | 0.3 | 1.517 | 64.2 |
| 14 | infinity | 0.77 | | |
| IMG | infinity | 0 | | |

TABLE 2

| Surface | K | A | B | C | D | E | F |
|---|---|---|---|---|---|---|---|
| 1 | −1.42E−01 | 6.22E−04 | −1.43E−03 | 5.67E−04 | −1.34E−04 | | |
| 2 | −7.43E+01 | 1.03E−03 | 2.65E−03 | −2.30E−03 | 5.42E−04 | −5.78E−05 | |
| 3 | 9.54E+00 | −1.56E−02 | 1.11E−02 | −4.87E−03 | 9.57E−04 | −7.64E−05 | |
| 4 | 0.00E+00 | −2.23E−02 | 1.14E−02 | −2.91E−03 | 3.28E−04 | | |
| 5 | 8.57E+01 | −2.53E−02 | 5.10E−03 | −1.44E−03 | 4.35E−04 | | |
| 6 | 1.67E+00 | −2.66E−02 | 7.27E−03 | −1.46E−03 | 2.48E−04 | | |
| 10 | −1.28E+00 | −1.09E−02 | 3.24E−03 | −6.87E−04 | 8.36E−05 | −3.85E−06 | |
| 11 | −5.91E+00 | −2.28E−02 | 1.59E−03 | 1.88E−05 | −3.93E−06 | 3.77E−09 | 3.89E−09 |
| 12 | −1.95E+00 | −2.35E−02 | 2.72E−03 | −2.05E−04 | 8.27E−06 | −1.34E−07 | 1.20E−10 |

TABLE 4

| Surface | K | A | B | C | D | E | F |
|---|---|---|---|---|---|---|---|
| 1 | −1.03E−01 | 5.60E−04 | −1.03E−03 | 4.76E−04 | −1.10E−04 | | |
| 2 | −9.42E+01 | −8.65E−04 | 3.70E−03 | −1.94E−03 | 3.15E−04 | −2.15E−05 | |
| 3 | 9.58E+00 | −1.88E−02 | 1.34E−02 | −5.16E−03 | 9.61E−04 | −6.12E−05 | |
| 4 | 0.00E+00 | −2.44E−02 | 1.34E−02 | −4.00E−03 | 6.36E−04 | | |
| 5 | 9.90E+01 | −2.58E−02 | 1.59E−03 | −2.67E−04 | −3.38E−05 | | |
| 6 | 2.15E+00 | −2.61E−02 | 5.05E−03 | −1.09E−03 | 2.01E−04 | | |
| 7 | 0.00E+00 | 4.31E−04 | 2.13E−04 | 1.03E−04 | 6.49E−05 | 4.94E−06 | |
| 8 | 0.00E+00 | 2.09E−04 | 3.36E−04 | 3.07E−05 | 1.06E−05 | 3.59E−06 | |
| 10 | −2.97E+00 | −8.07E−03 | 3.08E−03 | −6.82E−04 | 7.78E−05 | −3.63E−06 | |
| 11 | −9.52E+00 | −1.97E−02 | 1.33E−03 | 2.71E−05 | −3.72E−06 | −2.72E−08 | 4.79E−09 |
| 12 | −2.81E+00 | −1.81E−02 | 2.17E−03 | −1.84E−04 | 8.49E−06 | −1.66E−07 | 6.53E−10 |

Figure 5:
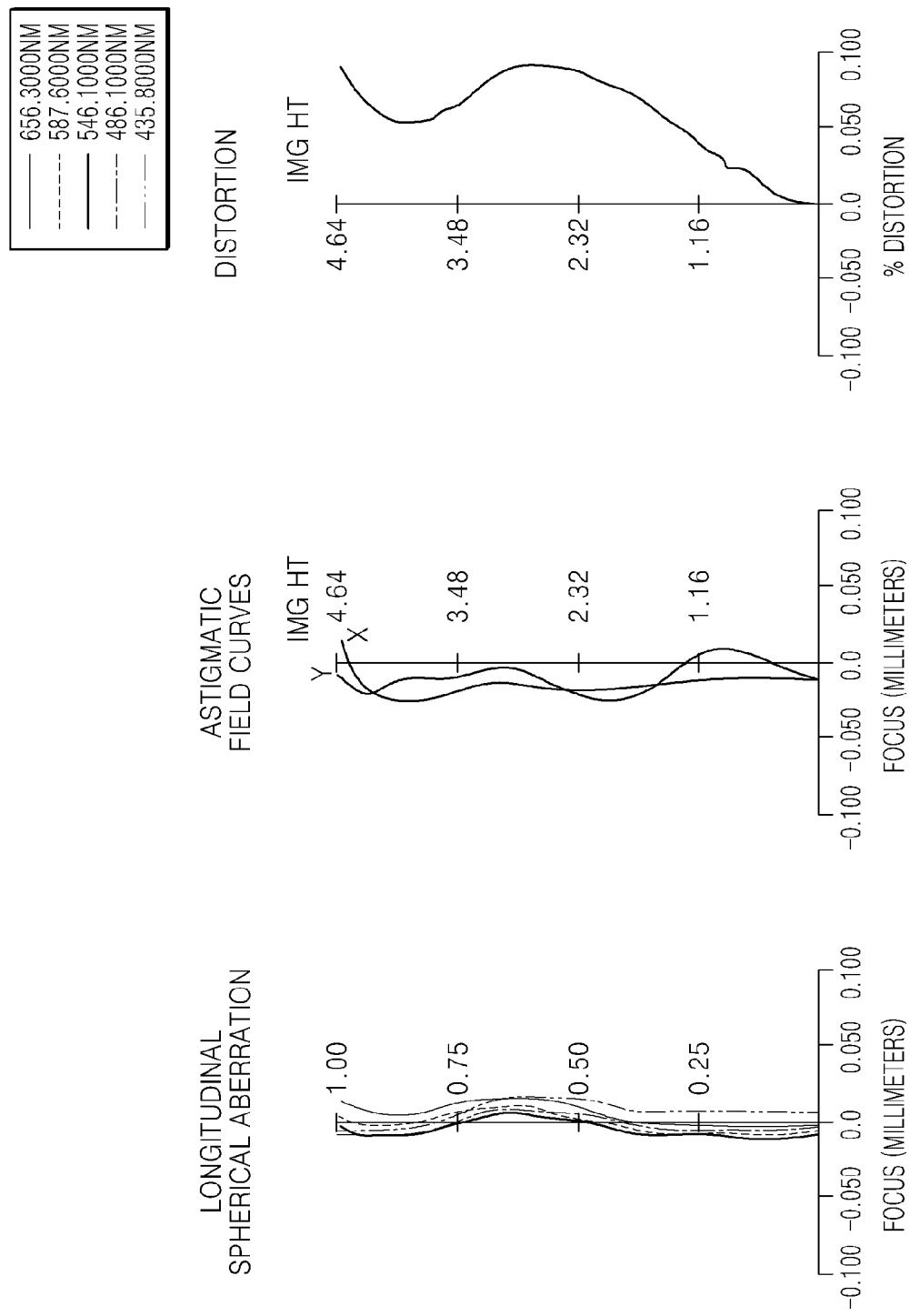
FIG. 5 is an aberration diagram illustrating longitudinal spherical aberration, astigmatic field curves, and distortion of the imaging lens system of FIG. 4, according to an embodiment.
Figure 6:
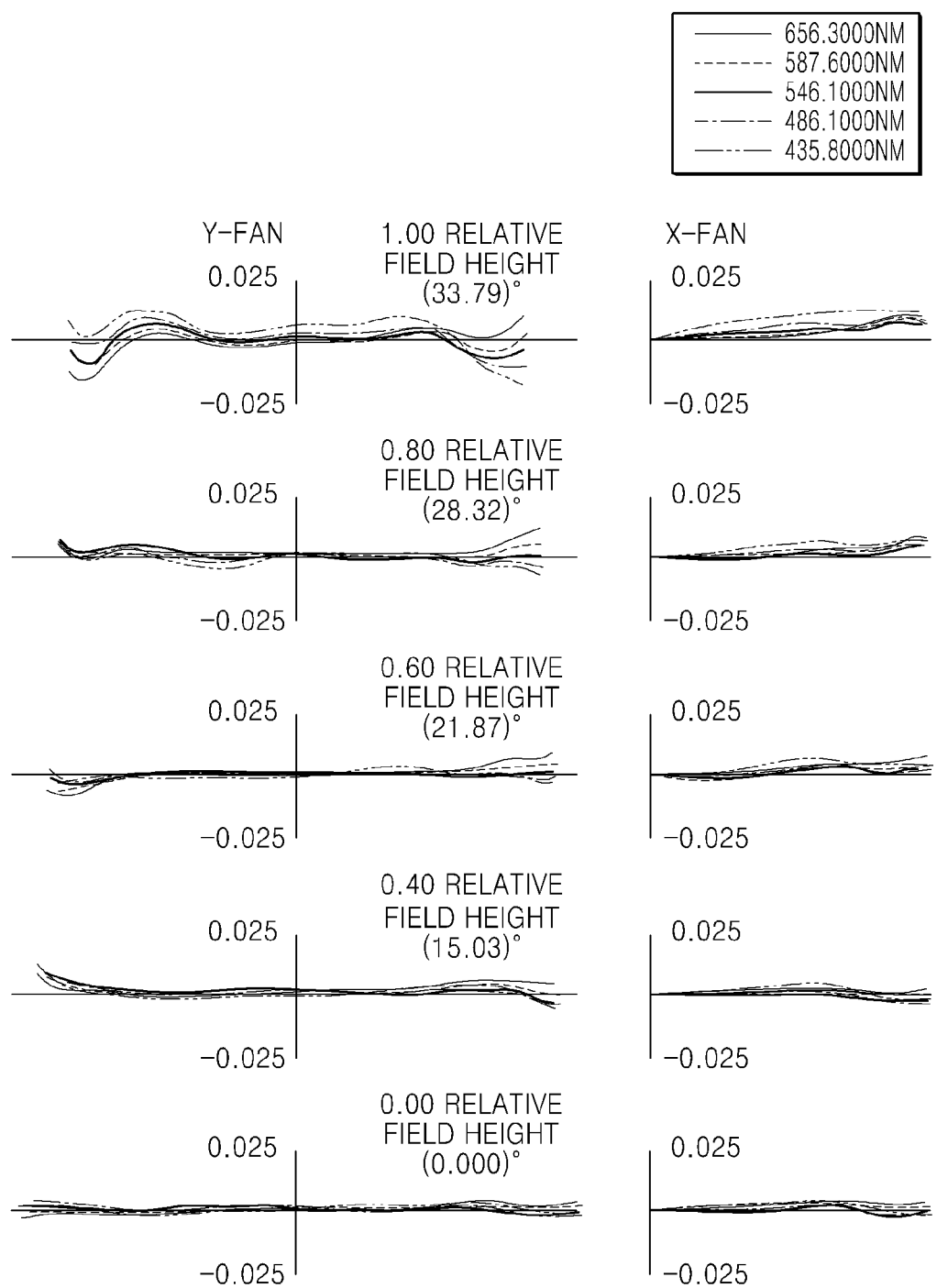
FIG. 6 is an aberration diagram illustrating coma aberration of the imaging lens system of FIG. 4, according to an embodiment.

FIG. 5 is an aberration diagram illustrating longitudinal spherical aberration, astigmatic field curves, and distortion of the imaging lens system 400 of FIG. 4. FIG. 6 is an aberration diagram illustrating coma aberration of the imaging lens system 400 of FIG. 4.

Third Embodiment

Figure 7:
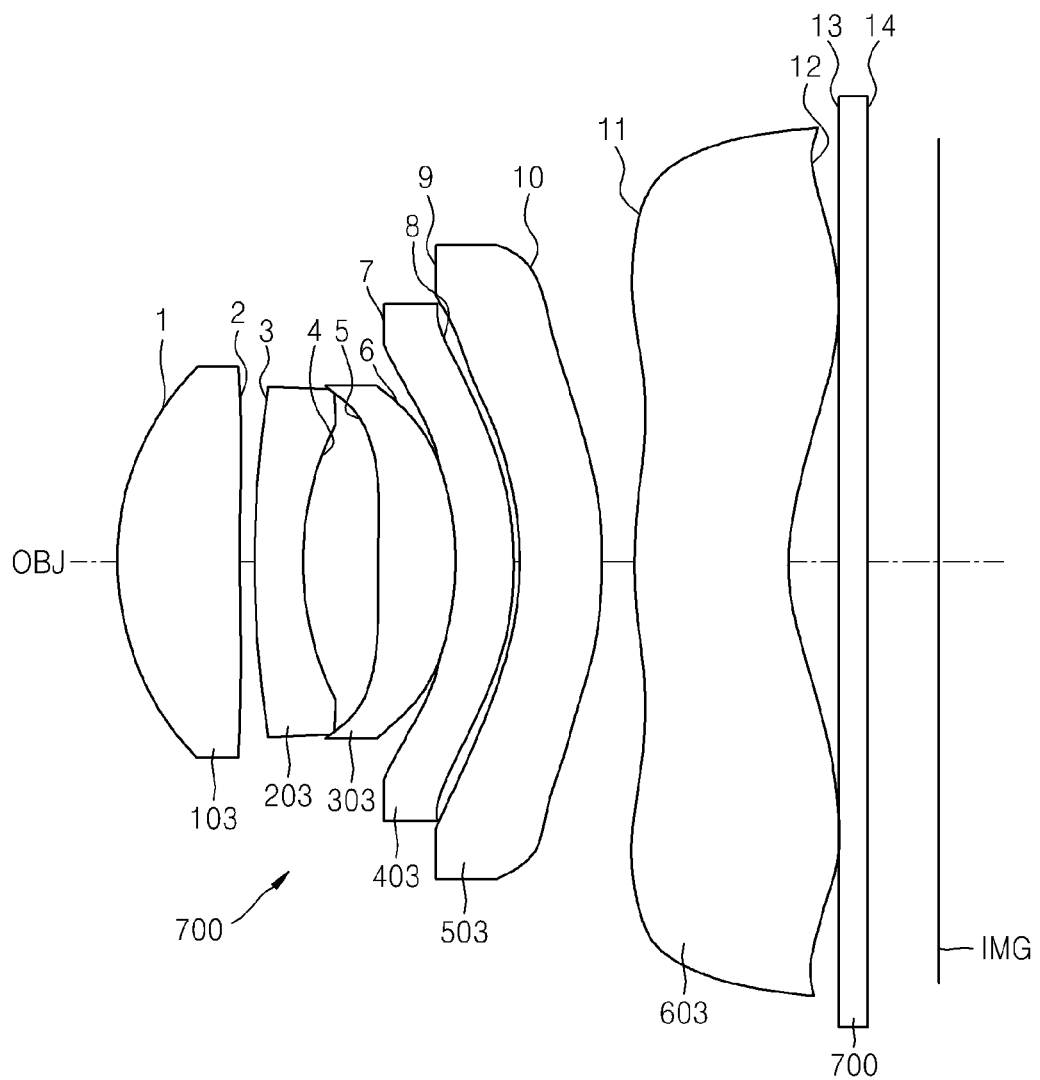
FIG. 7 is a cross-sectional view illustrating an optical arrangement of an imaging lens system according to a third embodiment.

FIG. 7 is a cross-sectional view illustrating the optical arrangement of the imaging lens system 700 according to the third embodiment.

The imaging lens system 700 includes the first lens 103 having a positive refractive power, the second lens 203 having a negative refractive power, the third lens 303 having a positive refractive power, the fourth lens 403 having a negative refractive power, the fifth lens 503 having a negative refractive power, and the sixth lens 603 having a negative refractive power that are sequentially arranged from the object OBJ side to the image plane IMG side. A stop (not shown) is disposed on the image plane IMG side surface of the first lens 103.

Lens data of the third embodiment is as follows.

TABLE 5

| | Radius of curvature (R) | Thickness or interval | Refractive index (nd) | Abbe number (vd) |
|---|---|---|---|---|
| OBJ | infinity | infinity | | |
| 1* | 2.982 | 1.3 | 1.605 | 57.44 |
| 2(ST)* | 62.275 | 0.175 | | |
| 3* | 8.833 | 0.5 | 1.643 | 22.4 |
| 4* | 3.427 | 0.823 | | |
| 5* | −496.112 | 0.8 | 1.544 | 56.09 |
| 6* | −4.826 | 0.05 | | |
| 7* | −3.105 | 0.6 | 1.636 | 23.9 |
| 8* | −3.538 | 0.05 | | |

TABLE 5-continued

| | Radius of curvature (R) | Thickness or interval | Refractive index (nd) | Abbe number (vd) |
|---|---|---|---|---|
| 9* | −3.648 | 0.9 | 1.544 | 56.09 |
| 10* | −4.25 | 0.353 | | |
| 11* | 5.005 | 1.654 | 1.544 | 56.09 |
| 12* | 2.699 | 0.537 | | |
| 13 | infinity | 0.3 | 1.517 | 64.2 |
| 14 | infinity | 0.77 | | |
| IMG | infinity | 0 | | |

TABLE 6

| Surface | K | A | B | C | D | E | F |
|---|---|---|---|---|---|---|---|
| 1 | −2.8410E−02 | 6.0343E−04 | −3.4370E−04 | 2.3442E−04 | −4.9105E−05 | | |
| 2 | −9.9000E+01 | −5.4121E−03 | 5.2825E−03 | −1.9155E−03 | 2.8056E−04 | −1.9261E−05 | |
| 3 | 5.3254E+00 | −1.9756E−02 | 1.3463E−02 | −4.9561E−03 | 1.0525E−03 | −1.1575E−04 | |
| 4 | 0.0000E+00 | −1.3771E−02 | 1.0445E−02 | −2.5179E−03 | 4.3655E−04 | | |
| 5 | 9.9000E+01 | −2.9215E−02 | −2.1788E−04 | −7.6378E−04 | −1.9526E−04 | | |
| 6 | 4.4803E+00 | −3.1784E−02 | 4.4117E−03 | −8.5439E−04 | 2.7208E−05 | | |
| 7 | −2.9803E−01 | 1.5279E−03 | 1.1307E−04 | 7.7762E−05 | 1.7347E−05 | 4.4815E−08 | |
| 8 | 0.0000E+00 | 1.2468E−03 | 4.8264E−04 | 1.7443E−05 | 6.3630E−06 | −1.7403E−08 | |
| 9 | 0.0000E+00 | 4.1248E−03 | 1.3983E−04 | 6.6016E−05 | 3.2594E−06 | −8.8485E−07 | |
| 10 | −6.0651E+00 | −5.4178E−03 | 2.8885E−03 | −6.7704E−04 | 7.8788E−05 | −3.4434E−06 | |
| 11 | −1.2840E+01 | −1.8999E−02 | 1.3665E−03 | 2.7447E−05 | −3.8745E−06 | −3.0647E−08 | 5.2018E−09 |
| 12 | −2.9249E+00 | −1.7323E−02 | 2.0563E−03 | −1.7497E−04 | 8.1473E−06 | −1.7565E−07 | 1.3955E−09 |

Figure 8:
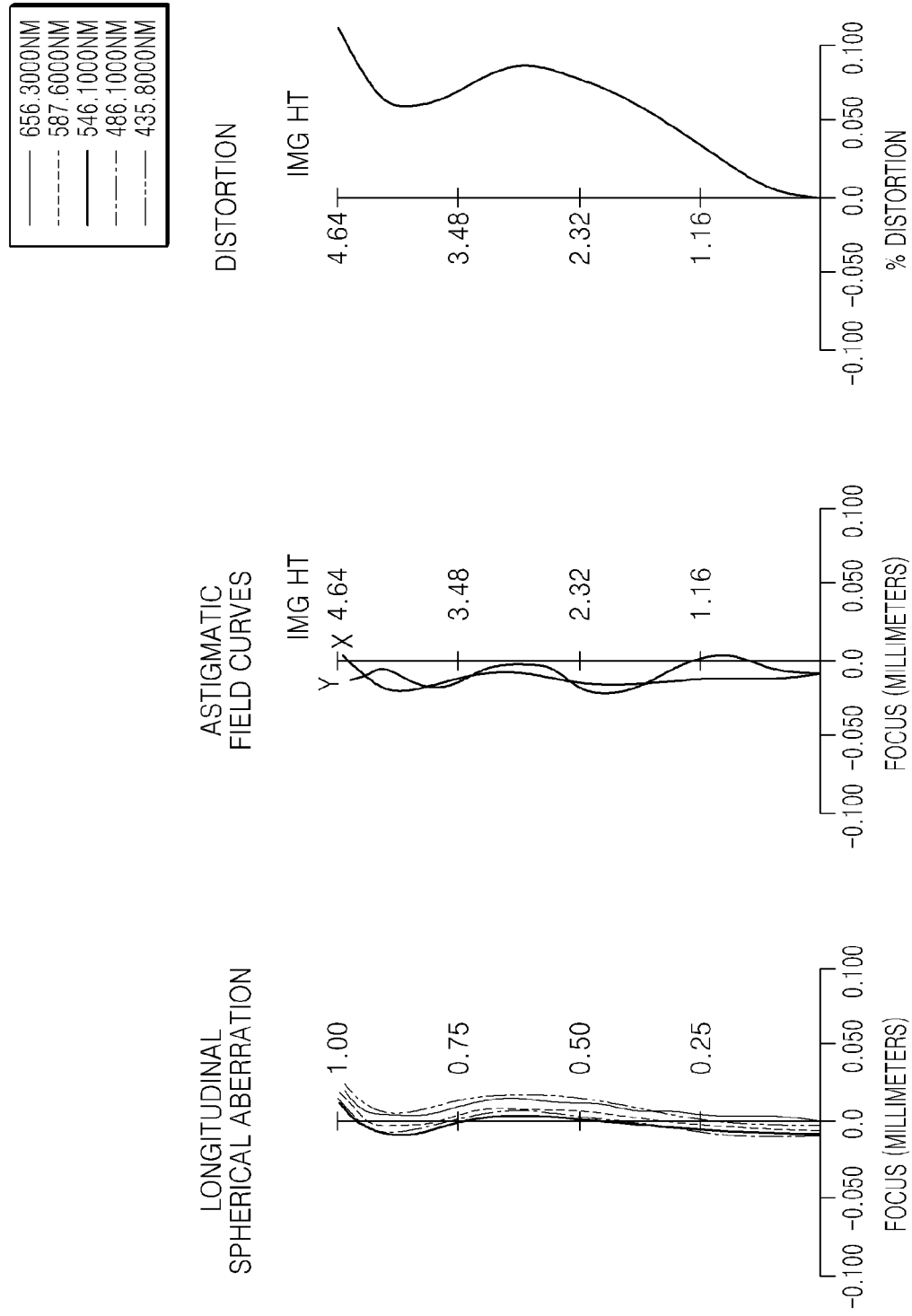
FIG. 8 is an aberration diagram illustrating longitudinal spherical aberration, astigmatic field curves, and distortion of the imaging lens system of FIG. 7, according to an embodiment.
Figure 9:
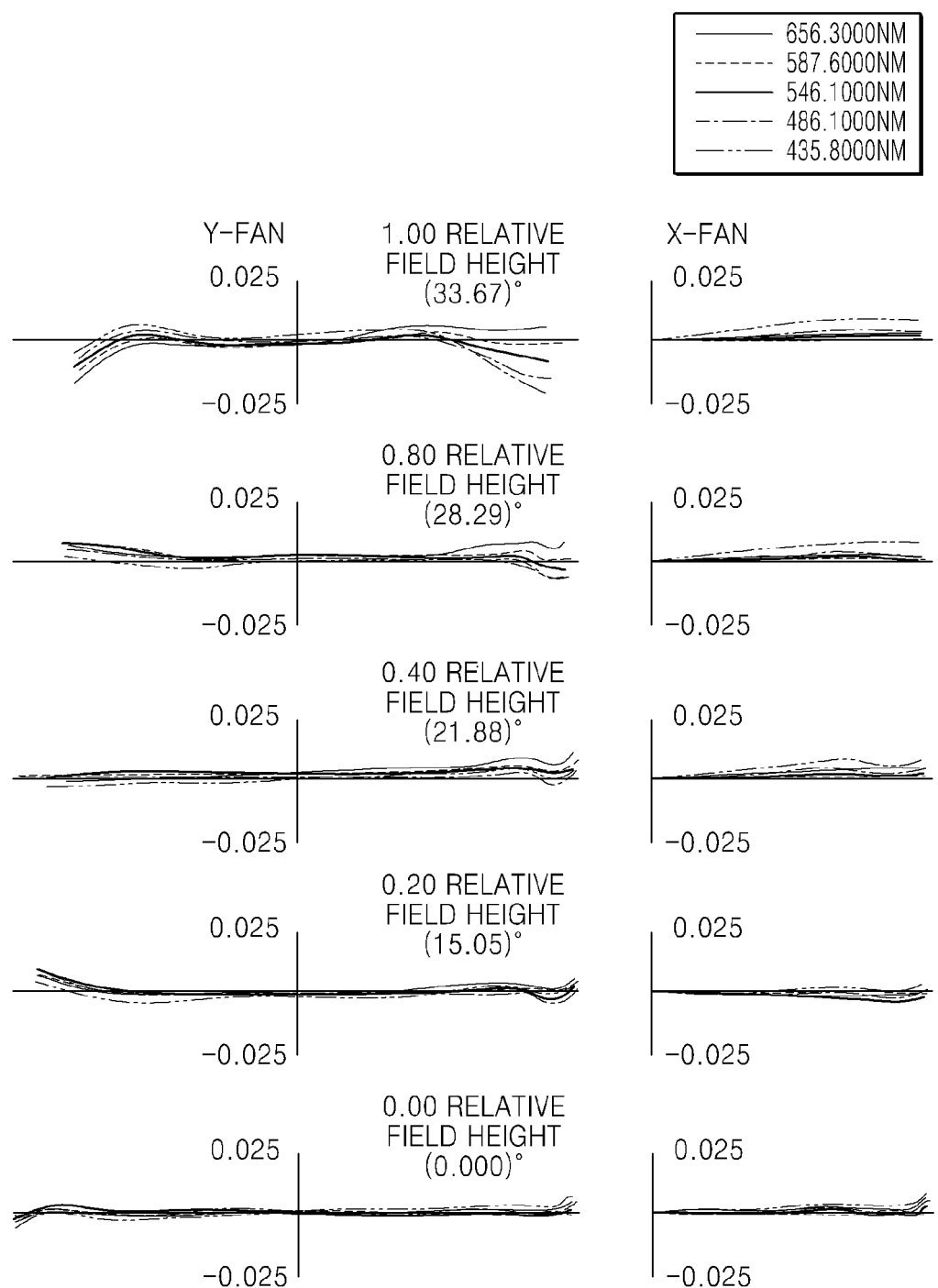
FIG. 9 is an aberration diagram illustrating coma aberration of the imaging lens system of FIG. 7, according to an embodiment.

FIG. 8 is an aberration diagram illustrating longitudinal spherical aberration, astigmatic field curves, and distortion of the imaging lens system 700 of FIG. 7. FIG. 9 is an aberration diagram illustrating coma aberration of the imaging lens system 700 of FIG. 7.

Fourth Embodiment

Figure 10:
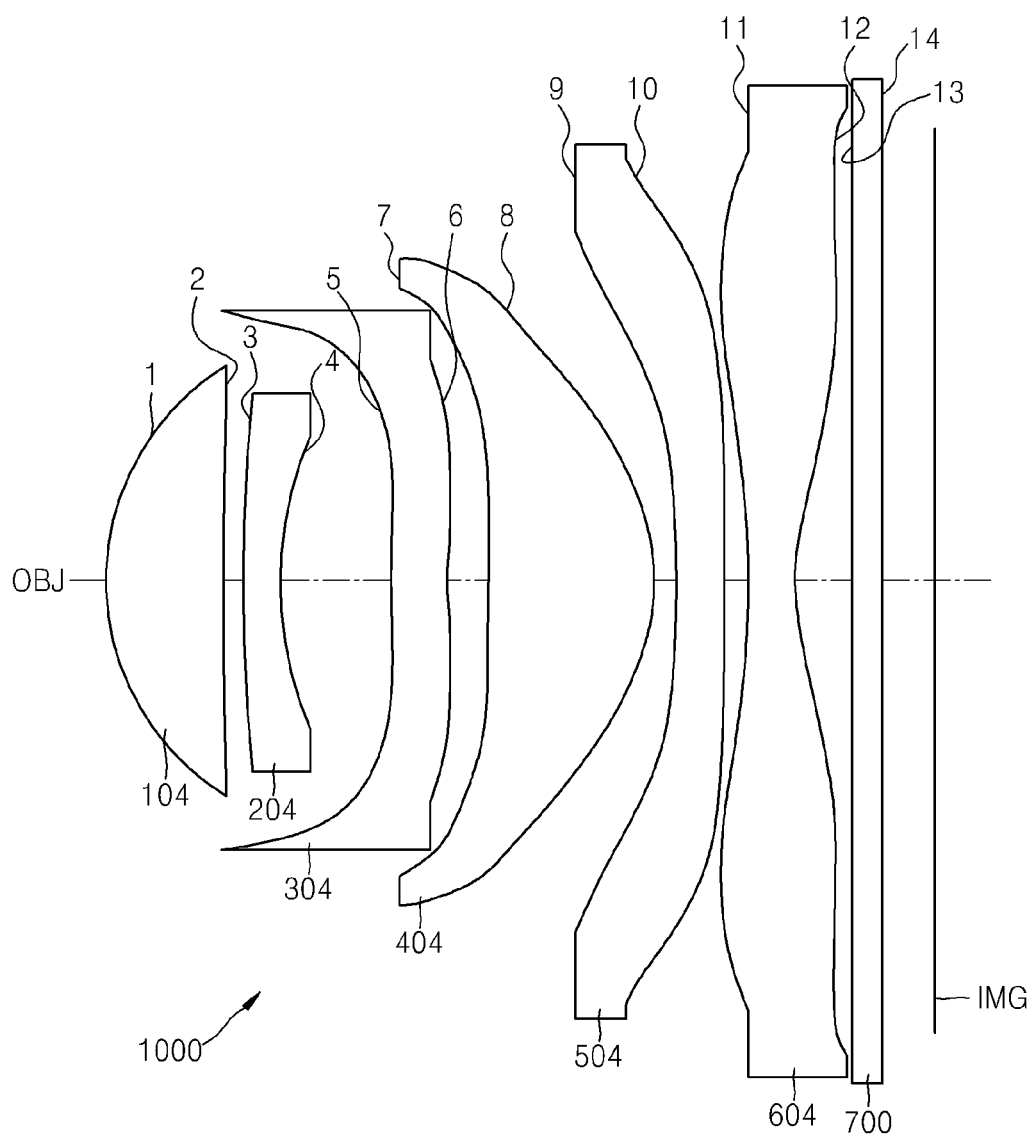
FIG. 10 is a cross-sectional view illustrating an optical arrangement of an imaging lens system according to a fourth embodiment.

FIG. 10 is a cross-sectional view illustrating the optical arrangement of the imaging lens system 1000 according to the fourth embodiment.

The imaging lens system 1000 includes the first lens 104 having a positive refractive power, the second lens 204 having a negative refractive power, the third lens 304 having a negative refractive power, the fourth lens 404 having a positive refractive power, the fifth lens 504 having a negative refractive power, and the sixth lens 604 having a negative refractive power that are sequentially arranged from the object OBJ side to the image plane IMG side. A stop ST is disposed on the image plane IMG side surface of the first lens 104.

Lens data of the fourth embodiment is as follows.

TABLE 7

|  | Radius of curvature (R) | Thickness or interval | Refractive index (nd) | Abbe number (vd) |
|---|---|---|---|---|
| OBJ | infinity | infinity | | |
| 1* | 2.784 | 1.209 | 1.531 | 55.75 |
| 2(ST)* | 44.569 | 0.165 | | |
| 3* | 6.848 | 0.4 | 1.651 | 21.54 |
| 4* | 3.391 | 1.176 | | |
| 5* | 18.892 | 0.591 | 1.636 | 23.91 |
| 6* | 11.886 | 0.416 | | |
| 7* | −200.467 | 1.717 | 1.531 | 55.75 |
| 8* | −2.116 | 0.229 | | |
| 9* | −25.448 | 0.5 | 1.531 | 55.75 |
| 10* | −300 | 0.249 | | |
| 11* | −9.003 | 0.5 | 1.544 | 56.11 |
| 12* | 2.772 | 0.6 | | |
| 13 | infinity | 0.3 | 1.517 | 64.2 |
| 14 | infinity | 0.549 | | |
| IMG | infinity | 0 | | |

TABLE 8

| Surface | K | A | B | C | D | E | F |
|---|---|---|---|---|---|---|---|
| 1 | 3.07E−02 | 7.17E−04 | 3.80E−04 | −1.17E−04 | 5.03E−05 | −4.33E−06 | 6.06E−07 |
| 2 | 1.00E+01 | −1.27E−02 | 9.05E−03 | −2.51E−03 | 2.59E−04 | 2.17E−05 | −5.12E−06 |
| 3 | 9.74E−01 | −3.84E−02 | 1.86E−02 | −4.83E−03 | 5.12E−04 | −1.70E−06 | −1.59E−06 |
| 4 | 3.78E−01 | −2.92E−02 | 1.44E−02 | −3.34E−03 | 4.05E−04 | −1.44E−06 | 6.94E−06 |
| 5 | −1.00E+00 | −2.19E−02 | −9.58E−05 | 1.23E−04 | −1.10E−05 | 7.85E−06 | −1.43E−06 |
| 6 | −9.00E+01 | −1.44E−02 | −6.15E−04 | 7.53E−05 | 2.04E−05 | 3.99E−06 | −5.75E−07 |
| 7 | −1.00E+00 | −9.01E−03 | 1.29E−03 | −1.03E−03 | 2.37E−04 | −2.02E−05 | 5.17E−07 |
| 8 | −3.87E+00 | −1.86E−02 | 3.85E−03 | −7.17E−04 | 6.61E−05 | −5.13E−07 | −1.61E−07 |
| 9 | 2.90E+01 | −1.54E−02 | 1.25E−03 | −2.53E−05 | −2.72E−06 | 2.99E−07 | −8.92E−09 |
| 10 | −1.00E+00 | −1.29E−03 | −1.44E−04 | −1.02E−06 | 7.73E−08 | 5.39E−09 | 1.93E−10 |
| 11 | −1.00E+00 | 2.29E−03 | 8.65E−05 | −2.72E−06 | −6.62E−08 | 1.86E−09 | 4.95E−11 |
| 12 | −8.19E+00 | −9.77E−03 | 1.16E−03 | −1.27E−04 | 9.40E−06 | −3.56E−07 | 5.17E−09 |

Figure 11:
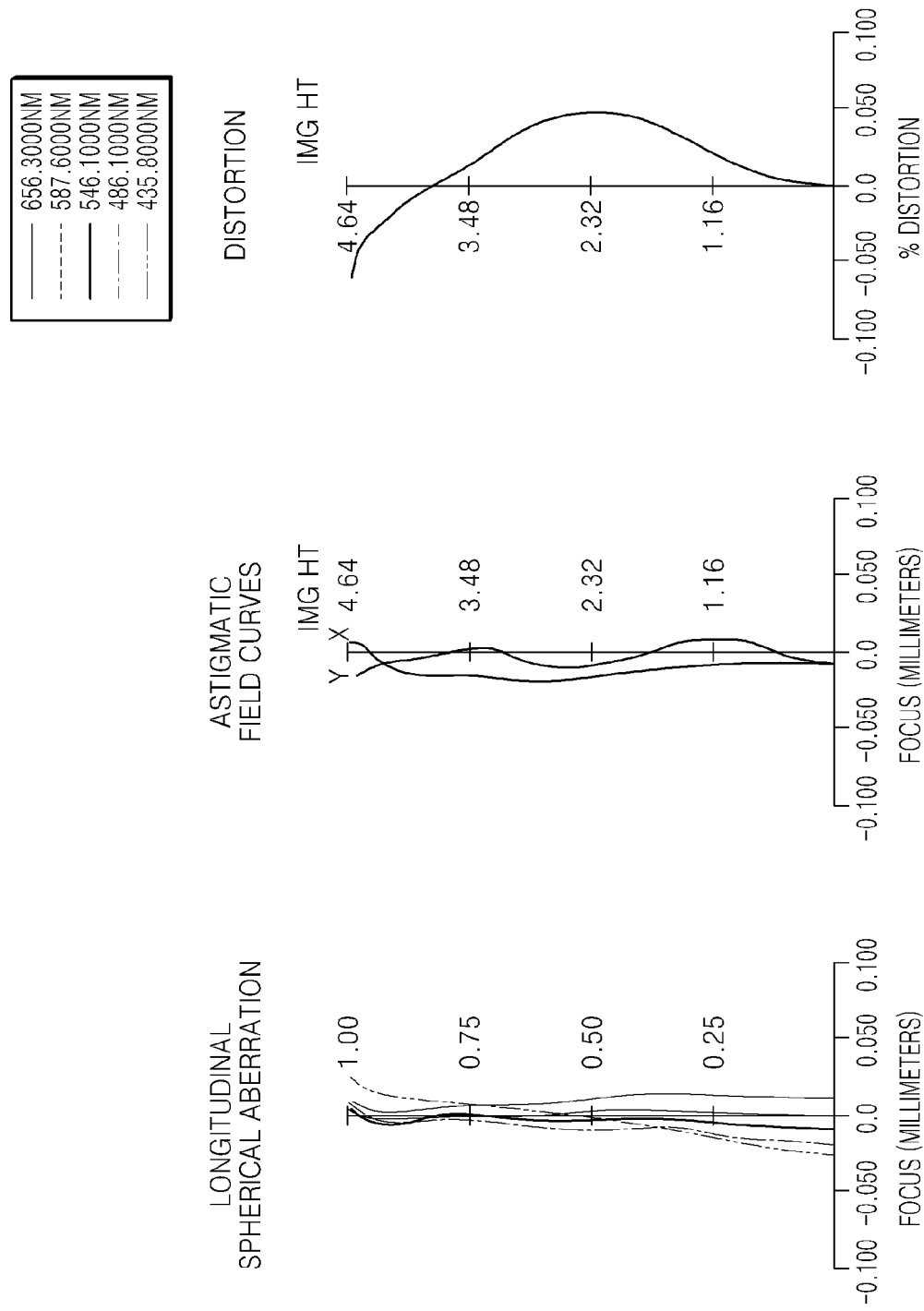
FIG. 11 is an aberration diagram illustrating longitudinal spherical aberration, astigmatic field curves, and distortion of the imaging lens system of FIG. 10, according to an embodiment.
Figure 12:
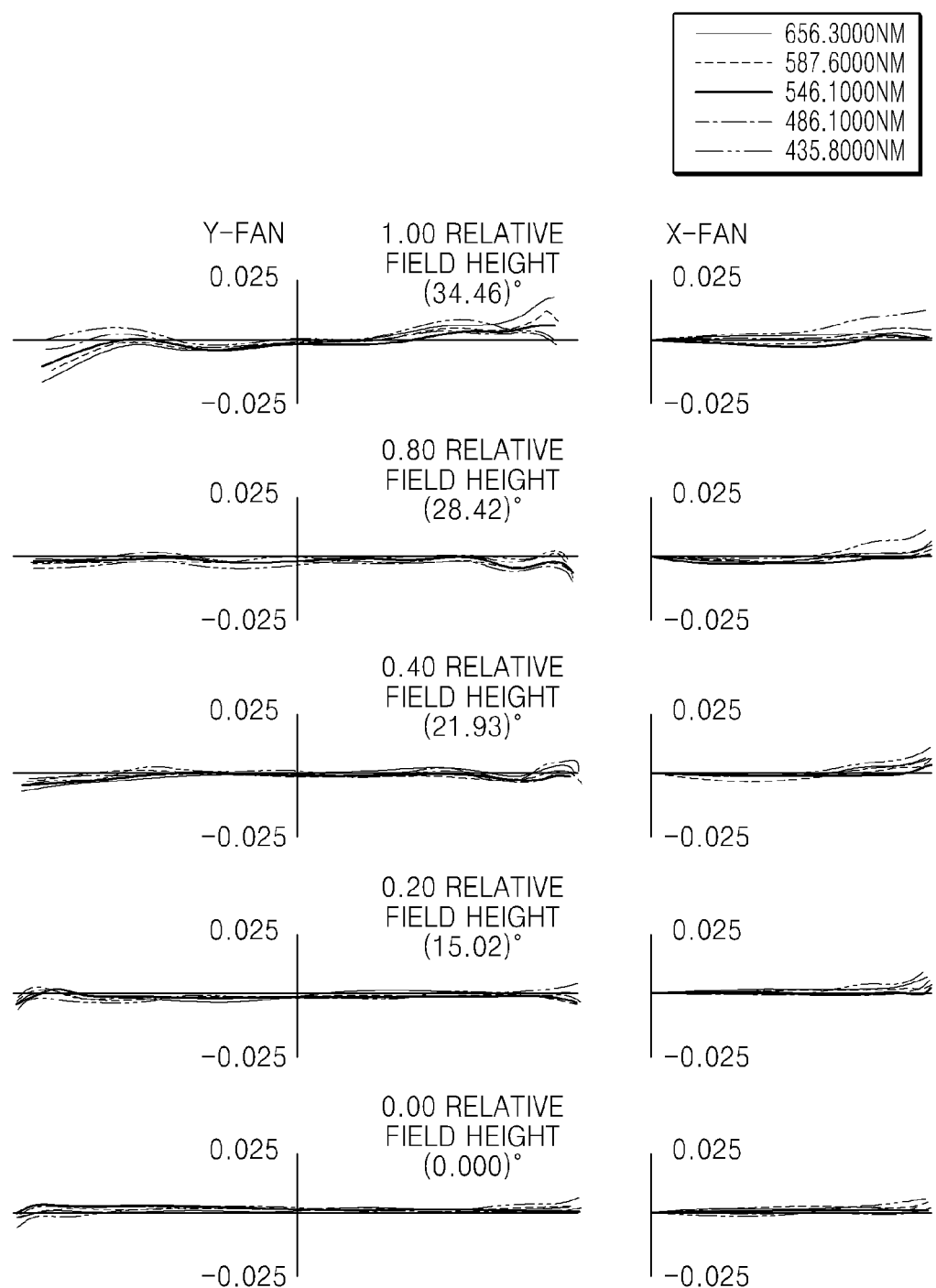
FIG. 12 is an aberration diagram illustrating coma aberration of the imaging lens system of FIG. 10, according to an embodiment.

FIG. 11 is an aberration diagram illustrating longitudinal spherical aberration, astigmatic field curves, and distortion of the imaging lens system 1000 of FIG. 10. FIG. 12 is an aberration diagram illustrating coma aberration of the imaging lens system 1000 of FIG. 10.

Fifth Embodiment

Figure 13:
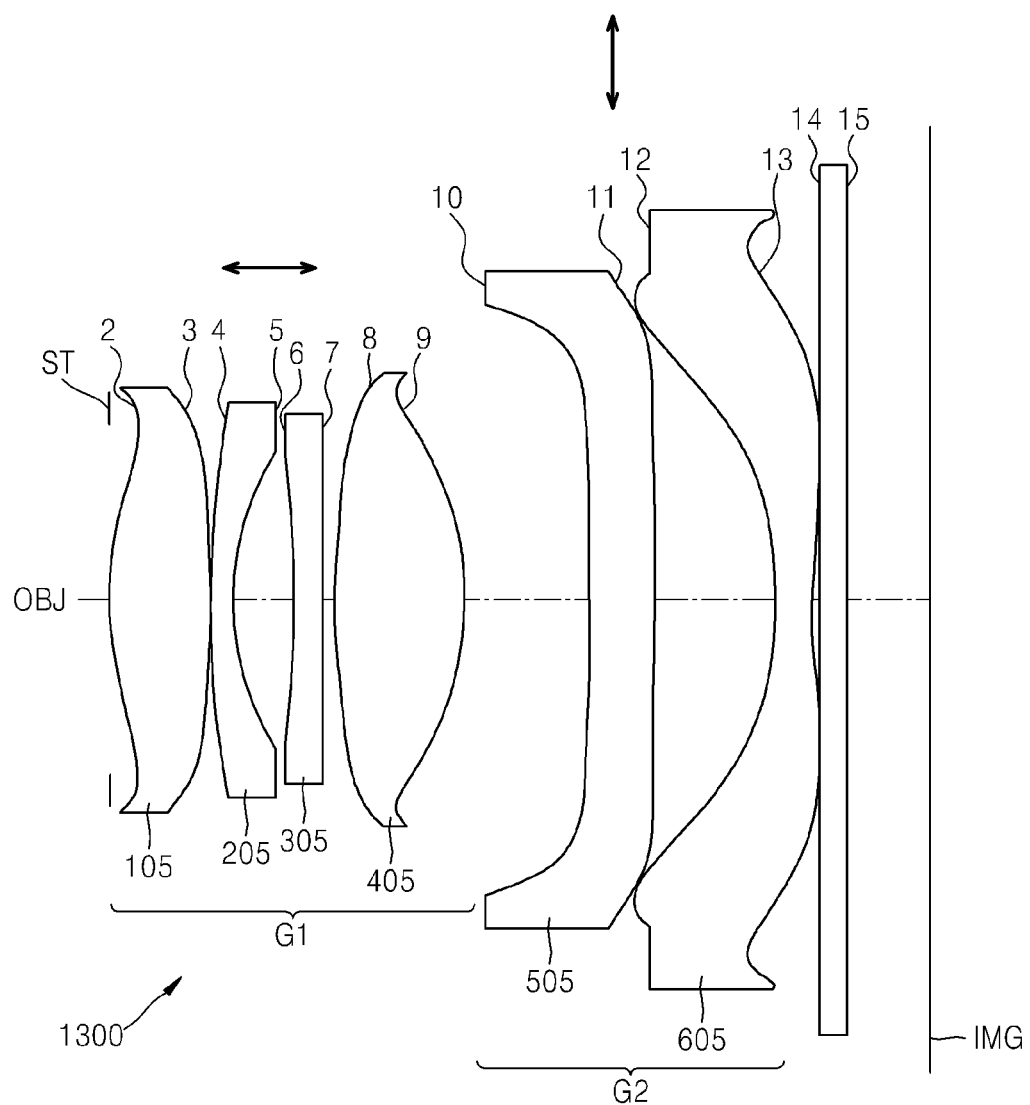
FIG. 13 is a cross-sectional view illustrating an optical arrangement of an imaging lens system according to a fifth embodiment.

FIG. 13 is a cross-sectional view illustrating the optical arrangement of the imaging lens system 1300 according to the fifth embodiment.

The imaging lens system 1300 includes the first lens 105 having a positive refractive power, the second lens 205 having a negative refractive power, the third lens 305 having a positive refractive power, the fourth lens 405 having a negative refractive power, the fifth lens 505 having a negative refractive power, and the sixth lens 605 having a negative refractive power that are sequentially arranged from the object OBJ side to the image plane IMG side. A stop ST is disposed on the object OBJ side of the first lens 105.

The first lens 105, the second lens 205, the third lens 305, the fourth lens 405, the fifth lens 505, and the sixth lens 605 may be divided into a front group G1 formed of a plurality of lenses that are relatively located on the object OBJ side and a rear group G2 formed of the rest of the lenses that are relatively located on the image plane IMG side. The front group G1 may be a focusing lens group. That is, when performing focusing to a nearest distance from an infinite object distance, the front group G1 moves along a direction of an optical axis, and the rear group G2 is fixed. As illustrated in FIG. 13, the front group G1 may be formed of the first lens 105, the second lens 205, the third lens 305, and the fourth lens 405, and the rear group G2 may be formed of the fifth lens 505 and the sixth lens 605.

Figure 14A:
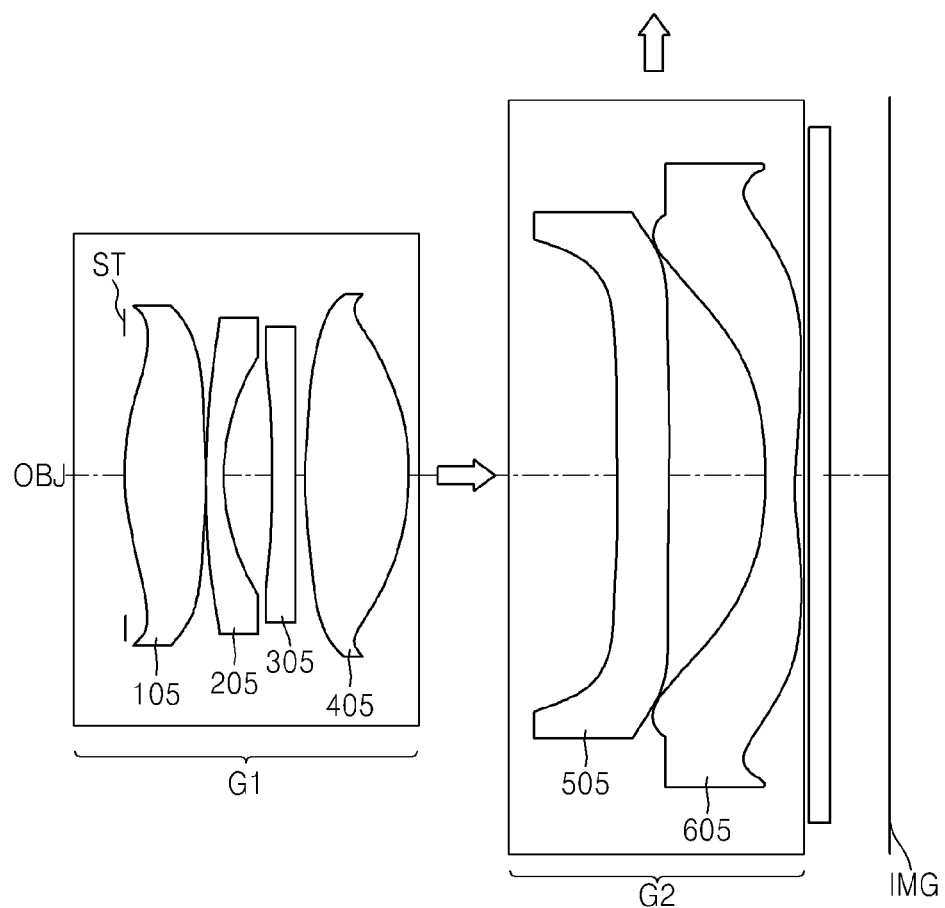
FIGS. 14A and 14B are cross-sectional views illustrating an example in which the imaging lens system of FIG. 13 is formed to be retractable, and FIGS. 14A and 14B respectively illustrate an optical arrangement in a photographing mode and a non-photographing mode, according to an embodiment.
Figure 14B:
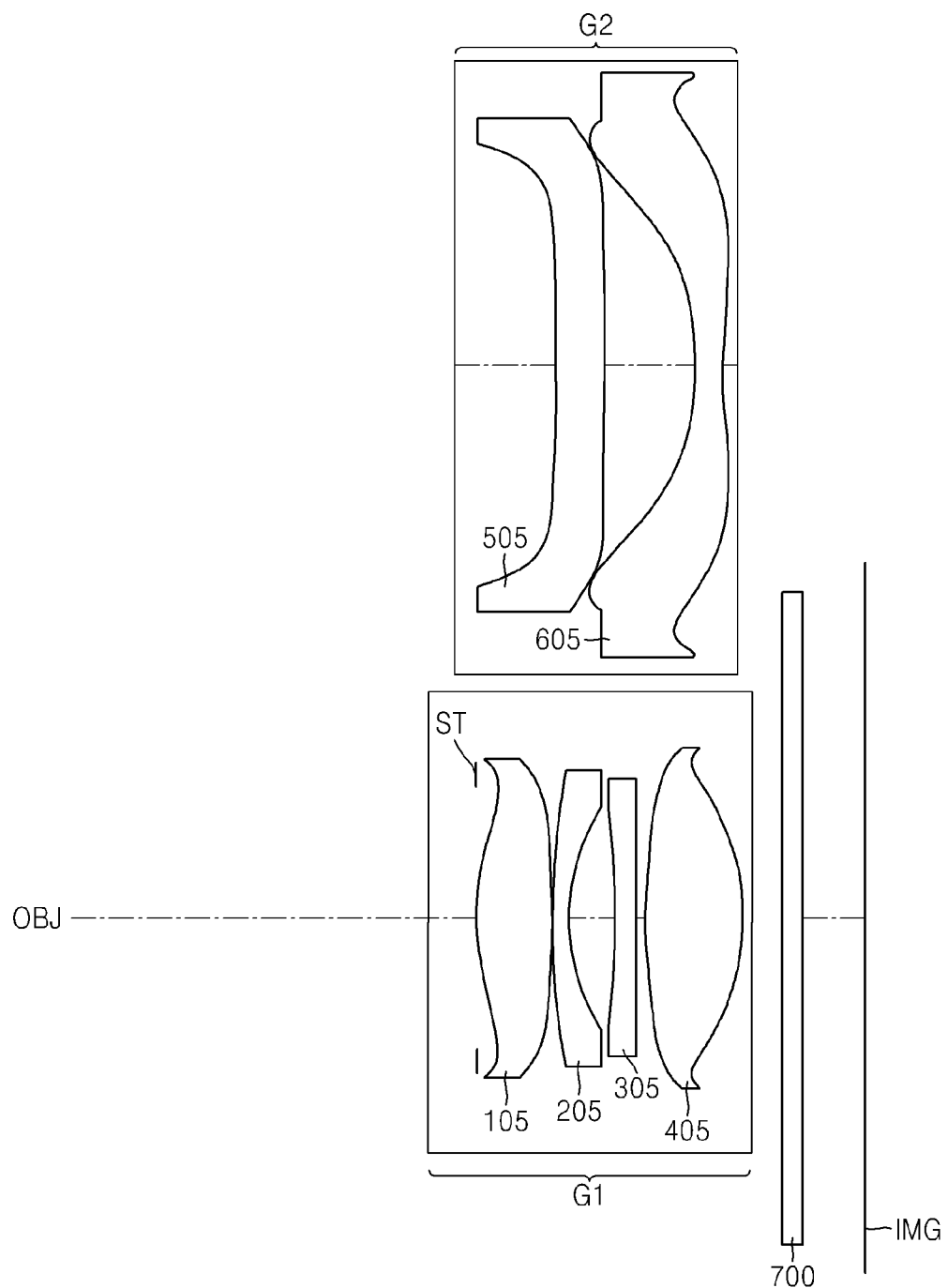

FIGS. 14A and 14B are cross-sectional views illustrating an example in which the imaging lens system 1300 of FIG. 13 is formed to be retractable, and FIGS. 14A and 14B respectively illustrate an optical arrangement in a photographing mode and a non-photographing mode.

The imaging lens system 1300 may have a retractable configuration so that a storage size may be minimized in the non-photographing mode.

The first lens 105, the second lens 205, the third lens 305, the fourth lens 405, the fifth lens 505, and the sixth lens 605 may be divided into a front group G1 formed of a plurality of lenses that are relatively located on the object OBJ side and a rear group G2 formed of the rest of the lenses that are relatively located on the image plane IMG side. As illustrated in FIG. 14A, in the photographing mode, the front group G1 and the rear group G2 are arranged along a common optical axis. The arrow direction illustrated in FIG. 14A indicates a direction in which the front group G1 and the rear group G2 will move to form the non-photographing mode. As illustrated in FIG. 14B, in the non-photographing mode, the rear group G2 is arranged by moving in a direction perpendicular to the optical axis, and the front group G1 may be arranged by moving toward the image plane IMG side along the optical axis. In the non-photographing mode, the optical total length is minimized so that the storage size is reduced.

Lens data of the fifth embodiment is as follows.

TABLE 9

|  | Radius of curvature (R) | Thickness or interval | Refractive index (Nd) | Abbe number (Vd) |
|---|---|---|---|---|
| OBJ | infinity | D0 | | |
| 1(ST) | infinity | 0 | | |
| 2* | 4.126 | 1.077 | 1.74 | 48.95 |
| 3* | −35.417 | 0.018 | | |
| 4* | 11.891 | 0.236 | 1.685 | 31.22 |
| 5* | 3.118 | 0.664 | | |
| 6* | −33.196 | 0.295 | 1.643 | 22.4 |
| 7* | 16.531 | 0.163 | | |
| 8* | 9.254 | 1.386 | 1.531 | 55.75 |
| 9* | −3.464 | D1 | | |
| 10* | −59.985 | 0.709 | 1.643 | 22.4 |
| 11* | −63.897 | 1.305 | | |
| 12* | −5.51 | 0.413 | 1.544 | 56.11 |
| 13* | 8.315 | 0.07 | | |
| 14 | infinity | 0.3 | 1.517 | 64.2 |
| 15 | infinity | 0.9 | | |
| IMG | infinity | 0 | | |

TABLE 10

| Surface | K | A | B | C | D | E | F |
|---|---|---|---|---|---|---|---|
| 2 | −9.83E−01 | −3.25E−03 | −7.41E−04 | −3.04E−04 | 8.45E−06 | −6.87E−07 | −9.60E−07 |
| 3 | 5.00E+01 | −5.64E−03 | −2.20E−04 | −4.28E−04 | 2.14E−05 | 1.11E−05 | −1.65E−06 |
| 4 | 2.66E+01 | −9.19E−03 | 3.44E−03 | −5.44E−04 | −3.28E−05 | −1.93E−05 | 5.94E−06 |
| 5 | 1.20E+00 | −1.08E−02 | 1.02E−03 | 6.61E−04 | −3.54E−04 | 5.19E−05 | −5.06E−06 |
| 6 | −1.00E+00 | −1.46E−02 | 5.88E−04 | 2.38E−04 | 2.81E−04 | 1.82E−05 | −2.55E−05 |
| 7 | 6.79E+01 | −2.08E−02 | 2.87E−03 | 4.03E−04 | 2.95E−05 | −1.29E−05 | −1.27E−05 |
| 8 | −1.00E+00 | −9.90E−03 | 2.41E−03 | 1.02E−04 | −8.34E−06 | −1.17E−05 | 1.75E−06 |
| 9 | −4.75E+00 | −1.49E−02 | 1.09E−03 | 1.20E−05 | −2.56E−05 | −3.42E−06 | 2.38E−06 |
| 10 | −1.00E+00 | −1.03E−03 | 4.61E−04 | −1.16E−04 | 3.06E−06 | 4.22E−07 | −8.43E−08 |
| 11 | −1.00E+00 | 2.28E−03 | −3.26E−04 | 3.85E−05 | −3.59E−06 | −4.76E−07 | 3.96E−08 |
| 12 | −1.00E+00 | −1.74E−02 | 9.63E−04 | 2.22E−05 | −1.39E−06 | 2.74E−08 | 7.40E−09 |
| 13 | −1.00E+00 | −1.56E−02 | 1.15E−03 | −6.98E−05 | 1.12E−06 | 4.50E−08 | 1.17E−09 |

TABLE 11

|  | Pos1 | Pos2 | Pos3 |
|---|---|---|---|
| D0 | infinity | 1200 | 300 |
| D1 | 1.351 | 1.379 | 1.454 |
| ω | 36.456 | 36.35 | 36.07 |
| F/# | 1.862 | 1.87 | 1.899 |
| TL | 8.888 | 8.916 | 8.989 |

Figure 15:
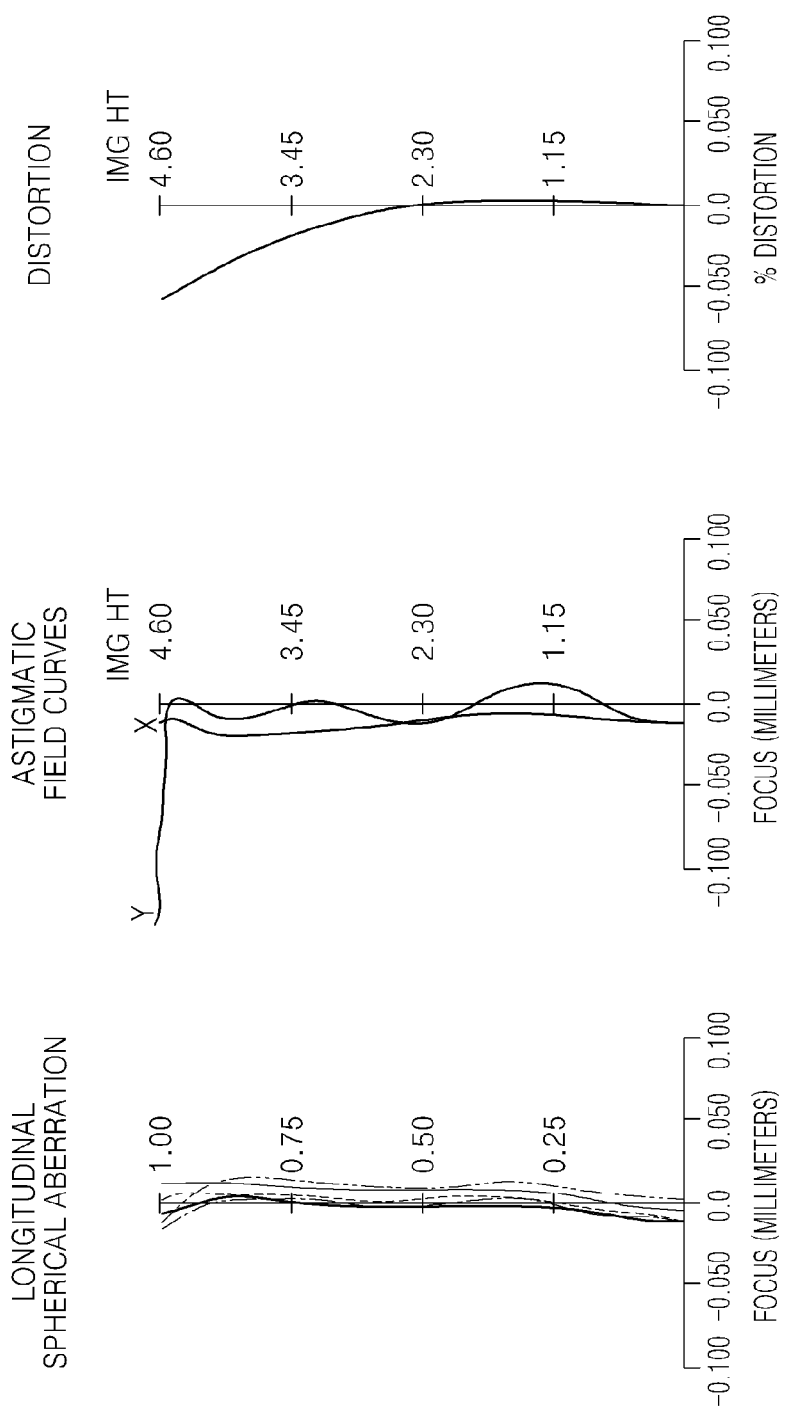
FIG. 15 is an aberration diagram illustrating longitudinal spherical aberration, astigmatic field curves, and distortion of the imaging lens system of FIG. 13, according to an embodiment.
Figure 16:
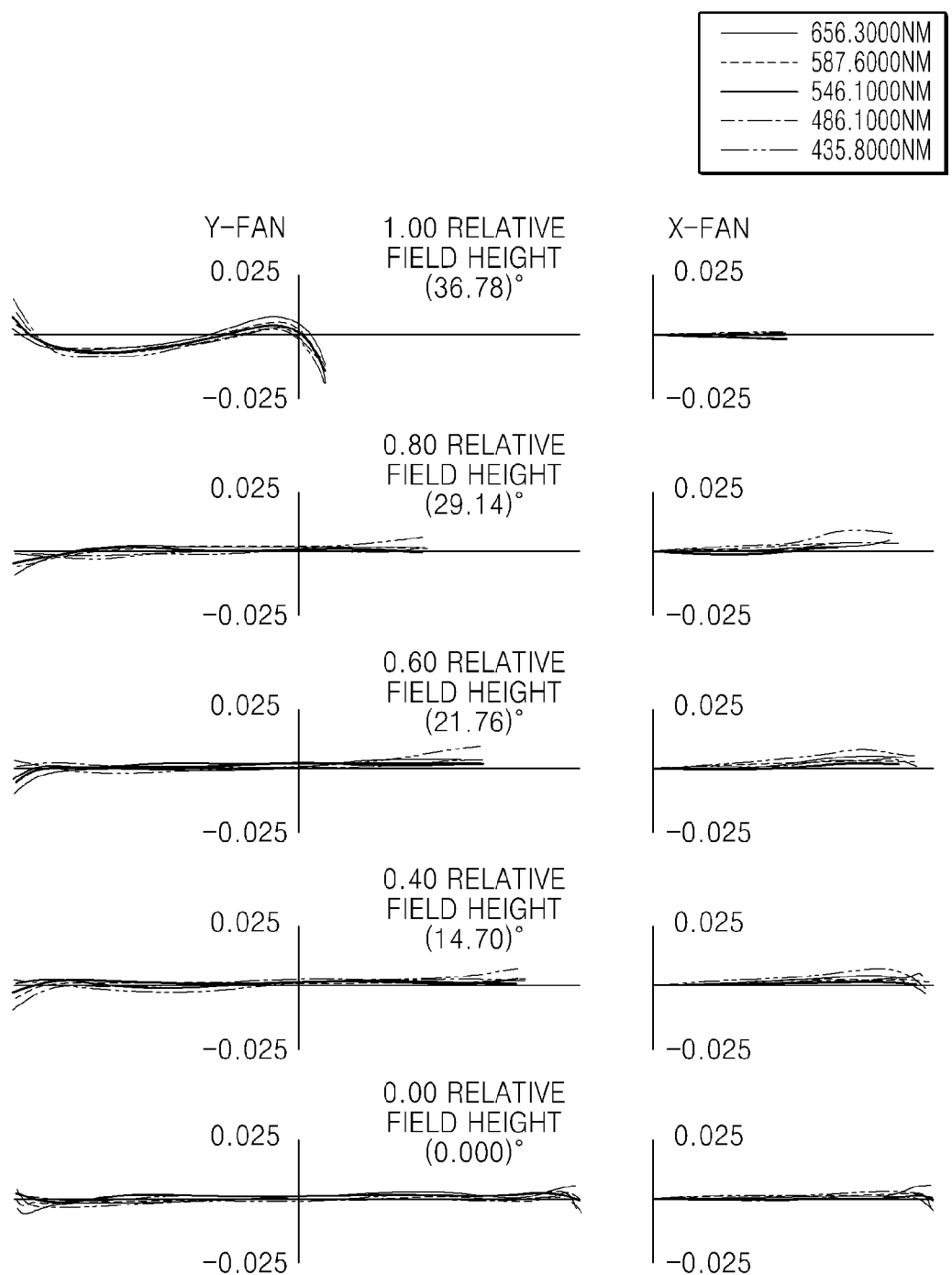
FIG. 16 is an aberration diagram illustrating coma aberration of the imaging lens system of FIG. 13, according to an embodiment.

FIG. 15 is an aberration diagram illustrating longitudinal spherical aberration, astigmatic field curves, and distortion of the imaging lens system 1300 of FIG. 13. FIG. 16 is an aberration diagram illustrating coma aberration of the imaging lens system 1300 of FIG. 13.

The below table illustrates an optical total length TL, a focal length f, an F-number, a focal length $f_1$, $f_2$, $f_3$, $f_4$, $f_5$, and $f_6$ of each of the lenses, and a half angle of view ω of the imaging lens system according to the various embodiments.

TABLE 12

|  | 1st embodiment | 2nd embodiment | 3rd embodiment | 4th embodiment | 5th embodiment |
|---|---|---|---|---|---|
| TL | 8.89 mm | 8.90 mm | 8.81 mm | 8.60 mm | 8.89 mm |
| f | 6.70 mm | 6.80 mm | 6.80 mm | 6.84 mm | 7.00 mm |
| F/# | 1.89 | 1.9 | 2 | 1.94 | 1.86 |
| ω | 34.23° | 33.79° | 33.67° | 34.46° | 36.78° |
| $f_1$ | 4.83 mm | 4.86 mm | 5.10 mm | 5.51 mm | 5.03 mm |
| $f_2$ | −8.16 mm | −7.89 mm | −8.95 mm | −10.71 mm | −6.19 mm |
| $f_3$ | 10.77 mm | 9.77 mm | 8.91 mm | −51.65 mm | −16.95 mm |
| $f_4$ | −33.27 mm | −57.08 mm | −86.28 mm | 4.00 mm | 4.91 mm |
| $f_5$ | −200.00 mm | −300.00 mm | −100.06 mm | −52.16 mm | −1624.16 mm |
| $f_6$ | −29.53 mm | −17.44 mm | −14.35 mm | −3.82 mm | −6.00 mm |

The below table illustrates that the embodiments mostly satisfy the described conditional expressions 1 through 10.

TABLE 13

| Conditions | 1st embodiment | 2nd embodiment | 3rd embodiment | 4th embodiment | 5th embodiment |
|---|---|---|---|---|---|
| (1) $15 < V_1-V_2 < 45$ | 33.7 | 33.7 | 33.7 | 34.2 | 17.7 |
| (2) $1.5 \leq f/EPD \leq 2.4$ | 1.89 | 1.9 | 2 | 1.94 | 1.86 |
| (3) $0.70 < f/f_1 < 1.9$ | 1.39 | 1.4 | 1.33 | 1.24 | 1.39 |
| (4) $0.9 < TL/f < 2.0$ | 1.33 | 1.31 | 1.3 | 1.26 | 1.27 |
| (5) $2.0 < f_5/f_6 < 25$ | 6.77 | 17.2 | 6.97 | 13.65 | 270.66 |
| (6) $1.52 < N_1 < 1.85$ | 1.544 | 1.544 | 1.605 | 1.531 | 1.74 |
| (7) $1.58 < N_2 < 1.90$ | 1.643 | 1.643 | 1.643 | 1.651 | 1.685 |
| (8) $1.51 < N_6 < 1.56$ | 1.544 | 1.544 | 1.544 | 1.544 | 1.544 |
| (9) $Y_{img}/\tan ω > 5.5$ mm | 6.76 mm | 6.87 mm | 6.90 mm | 6.70 mm | 6.15 mm |
| (10) $0.02 < D_{air56}/f < 0.20$ | 0.0732 | 0.0634 | 0.0519 | 0.0364 | 0.0356 |

The imaging lens system that is a bright and large aperture lens as described above may appropriately correct optical aberrations and exhibit improved optical performance.

Also, the imaging lens system has a configuration of an optical system appropriate for large image sensors, and may be employed in high performance photographing apparatuses or electronic apparatuses that perform out-focusing.

The imaging lens system may be used with various kinds of electronic or imaging apparatuses along with an image sensor that converts an optical image formed by the imaging lens system into an electrical signal.

It should be understood that the exemplary embodiments described herein should be considered in a descriptive sense only and not for purposes of limitation. Descriptions of features or aspects within each embodiment should typically be considered as available for other similar features or aspects in other embodiments.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. An imaging lens system comprising:
a first lens that comprises a convex object side surface and has a positive refractive power;
a second lens that comprises a concave image plane side surface and has a negative refractive power;
a third lens that has a positive or negative refractive power;
a fourth lens that comprises a convex image plane side surface and has a positive or negative refractive power;
a fifth lens that comprises a convex image plane side surface and has a negative refractive power; and
a sixth lens that has a negative refractive power,
wherein the first through sixth lenses are sequentially arranged from an object side to an image plane side, wherein the imaging lens system satisfies the following conditional expression, $1.4 \leq f/EPD \leq 2.0$, wherein f is a focal length of the imaging lens system and EPD is an effective diameter of the imaging lens system, and wherein the imaging lens system satisfies the following conditional expression, $1.2 \leq f/f_1 \leq 1.9$, wherein f is a focal length of the imaging lens system and $f_1$ is a focal length of the first lens.

2. The imaging lens system of claim 1, wherein the imaging lens system satisfies the following conditional expression, $15 < V_1 - V_2 < 45$, wherein $V_1$ and $V_2$ are Abbe numbers of the first lens and the second lens, respectively.

3. The imaging lens system of claim 1, wherein the imaging lens system satisfies the following conditional expression, $0.9 < TL/f < 2.0$, wherein f is a focal length of the imaging lens system and TL is a distance from a vertex of the object side surface of the first lens to the image plane.

4. The imaging lens system of claim 1, wherein the imaging lens system satisfies the following conditional expression, $2.0 < f_5/f_6 < 25$, wherein $f_5$ and $f_6$ are focal lengths of the fifth lens and the sixth lens, respectively.

5. The imaging lens system of claim 1, wherein an image plane side surface of the sixth lens is an aspherical surface that is concave near an optical axis and having at least one inflection point.

6. The imaging lens system of claim 1, wherein the imaging lens system satisfies the following conditional expression, $1.52 < N_1 < 1.85$, $1.58 < N_2 < 1.90$, and $1.51 < N_6 < 1.56$, wherein $N_1$, $N_2$, and $N_6$ are refractive indexes of the first lens, the second lens, and the sixth lens, respectively, at a d-line.

7. The imaging lens system of claim 1, wherein the imaging lens system satisfies the following condition, $Y_{img}/\tan \omega > 5.5$ mm, wherein $Y_{img}$ is a maximum image height on the image plane and $\omega$ is a half angle of view.

8. The imaging lens system of claim 1, wherein the imaging lens system satisfies the following conditional expression, $0.02 < D_{air56}/f < 0.20$, wherein $D_{air56}$ is an axial air distance between the fifth lens and the sixth lens and f is a focal length of the imaging lens system.

9. The imaging lens system of claim 1, wherein each of the third through sixth lenses is formed of a plastic material.

10. The imaging lens system of claim 9, wherein the first lens is formed of a glass material.

11. The imaging lens system of claim 1, wherein a high-dispersive material having an Abbe number smaller than 35 is used in two or more lenses of the first through sixth lenses.

12. The imaging lens system of claim 1, wherein at least one of the first lens, the second lens, the third lens, the fourth lens, the fifth lens, and the sixth lens moves along an optical axis to perform focusing.

13. The imaging lens system of claim 12, wherein the at least one of the first lens, the second lens, the third lens, the fourth lens, the fifth lens, and the sixth lens, which is relatively located on the object side, forms a focusing lens group, and when performing focusing, the focusing lens group moves along the optical axis and the remaining lenses of the first lens, the second lens, the third lens, the fourth lens, the fifth lens, and the sixth lens are fixed.

14. The imaging lens system of claim 13, wherein the focusing lens group is formed of the first lens, the second lens, the third lens, and the fourth lens.

15. The imaging lens system of claim 1, wherein the first through sixth lenses are divided into a front group formed of at least one lens that is relatively located on the object side and a rear group formed of the remaining lenses of the first lens, the second lens, the third lens, the fourth lens, the fifth lens, and the sixth lens that are relatively located on the image plane side, in a photographing mode, the front group and the rear group are arranged along a common optical axis, and in a non-photographing mode, the rear group is arranged by moving in a direction perpendicular to the optical axis, and the front group is arranged by moving toward the image plane side along the optical axis.

16. The imaging lens system of claim 15, wherein the front group is formed of the first lens, the second lens, the third lens, and the fourth lens, and the rear group is formed of the fifth lens and the sixth lens.

17. An electronic apparatus comprising:

the imaging lens system of claim 1; and an image sensor that converts an optical image formed by the imaging lens system into an electrical signal.

18. The electronic apparatus of claim 17, wherein at least one lens of the imaging lens system moves along an optical axis to perform focusing.

19. The electronic apparatus of claim 17, wherein the first through sixth lenses of the imaging lens system are divided into a front group formed of at least one lens that is relatively located on the object side and a rear group formed of the remaining lenses that are relatively located on the image plane side, in a photographing mode, the front group and the rear group are arranged along a common optical axis, and in a non-photographing mode, the rear group is arranged by moving in a direction perpendicular to the optical axis, and the front group is arranged by moving toward the image plane side along the optical axis.

* * * * *